# USOO8648959B2

(12) United States Patent
Capata et al.

(10) Patent No.: US 8,648,959 B2
(45) Date of Patent: Feb. 11, 2014

(54) RAPID AUTO-FOCUS USING CLASSIFIER CHAINS, MEMS AND/OR MULTIPLE OBJECT FOCUSING

(75) Inventors: Adrian Capata, Bucharest (RO); Stefan Petrescu, Bucharest (RO); Petronel Bigioi, Galway (IE); Peter Corcoran, Claregalway (IE)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 292 days.

(21) Appl. No.: 12/944,701

(22) Filed: Nov. 11, 2010

(65) Prior Publication Data
US 2012/0120283 A1    May 17, 2012

(51) Int. Cl.
  *H04N 5/232*  (2006.01)
  *H04N 5/225*  (2006.01)
  *G06K 9/00*  (2006.01)
  *G06K 9/40*  (2006.01)

(52) U.S. Cl.
USPC ........... 348/345; 348/169; 348/349; 382/118; 382/255

(58) Field of Classification Search
USPC ......... 348/345, 346, 169, 239, 349, 352–354; 382/118, 255
See application file for complete search history.

(56) References Cited

U.S. PATENT DOCUMENTS

| 4,448,510 | A  | 5/1984  | Murakoshi et al. |
|-----------|----|---------|------------------|
| 5,926,212 | A  | 7/1999  | Kondo |
| 6,122,004 | A  | 9/2000  | Hwang |
| 6,246,790 | B1 | 6/2001  | Huang et al. |
| 6,747,690 | B2 | 6/2004  | Mølgaard |
| 6,934,087 | B1 | 8/2005  | Gutierrez et al. |
| 7,113,688 | B2 | 9/2006  | Calvet et al. |
| 7,266,272 | B1 | 9/2007  | Calvet et al. |
| 7,269,292 | B2 | 9/2007  | Steinberg |
| 7,315,630 | B2 | 1/2008  | Steinberg et al. |
| 7,315,631 | B1 | 1/2008  | Corcoran et al. |
| 7,317,815 | B2 | 1/2008  | Steinberg et al. |
| 7,345,827 | B1 | 3/2008  | Tang et al. |

(Continued)

FOREIGN PATENT DOCUMENTS

| EP | 2037320 A1     | 3/2009 |
| WO | 2007/093199 A2 | 8/2007 |

(Continued)

OTHER PUBLICATIONS

PCT Notification of Transmittal of the International Search Report and the Written Opinion of the International Searching Authority, or the Declaration, for PCT Application No. PCT/EP2011/069904, report dated May 16, 2012, 17 pages.

(Continued)

*Primary Examiner* — Nhan T Tran
(74) *Attorney, Agent, or Firm* — Hickman Palermo Truong Becker Bingham Wong LLP

(57) ABSTRACT

A smart-focusing technique includes identifying an object of interest, such as a face, in a digital image. A focus-generic classifier chain is applied that is trained to match both focused and unfocused faces and/or data from a face tracking module is accepted. Multiple focus-specific classifier chains are applied, including a first chain trained to match substantially out of focus faces, and a second chain trained to match slightly out of focus faces. Focus position is rapidly adjusted using a MEMS component.

45 Claims, 15 Drawing Sheets
(2 of 15 Drawing Sheet(s) Filed in Color)

(56) References Cited

U.S. PATENT DOCUMENTS

| | | | |
|---|---|---|---|
| 7,359,130 B1 | 4/2008 | Calvet | |
| 7,359,131 B1 | 4/2008 | Gutierrez et al. | |
| 7,362,368 B2 | 4/2008 | Steinberg et al. | |
| 7,403,344 B2 | 7/2008 | Xu et al. | |
| 7,403,643 B2 | 7/2008 | Ianculescu et al. | |
| 7,440,593 B1 | 10/2008 | Steinberg et al. | |
| 7,460,694 B2 | 12/2008 | Corcoran et al. | |
| 7,460,695 B2 | 12/2008 | Steinberg et al. | |
| 7,466,866 B2 | 12/2008 | Steinberg | |
| 7,469,055 B2 | 12/2008 | Corcoran et al. | |
| 7,469,071 B2 | 12/2008 | Drimbarean et al. | |
| 7,471,846 B2 | 12/2008 | Steinberg et al. | |
| 7,477,400 B2 | 1/2009 | Gutierrez et al. | |
| 7,477,842 B2 | 1/2009 | Gutierrez | |
| 7,495,852 B2 | 2/2009 | Gutierrez | |
| 7,515,362 B1 | 4/2009 | Gutierrez et al. | |
| 7,515,740 B2 | 4/2009 | Corcoran et al. | |
| 7,518,635 B2 | 4/2009 | Kawahara et al. | |
| 7,545,591 B1 | 6/2009 | Tong et al. | |
| 7,551,754 B2 | 6/2009 | Steinberg et al. | |
| 7,551,755 B1 | 6/2009 | Steinberg et al. | |
| 7,555,210 B2 | 6/2009 | Calvet | |
| 7,558,408 B1 | 7/2009 | Steinberg et al. | |
| 7,560,679 B1 | 7/2009 | Gutierrez | |
| 7,565,070 B1 | 7/2009 | Gutierrez | |
| 7,574,016 B2 | 8/2009 | Steinberg et al. | |
| 7,583,006 B2 | 9/2009 | Calvet et al. | |
| 7,587,068 B1 | 9/2009 | Steinberg et al. | |
| 7,616,233 B2 | 11/2009 | Steinberg et al. | |
| 7,620,218 B2 | 11/2009 | Steinberg et al. | |
| 7,630,527 B2 | 12/2009 | Steinberg et al. | |
| 7,634,109 B2 | 12/2009 | Steinberg et al. | |
| 7,636,486 B2 | 12/2009 | Steinberg et al. | |
| 7,639,888 B2 | 12/2009 | Steinberg et al. | |
| 7,639,889 B2 | 12/2009 | Steinberg et al. | |
| 7,640,803 B1 | 1/2010 | Gutierrez et al. | |
| 7,646,969 B2 | 1/2010 | Calvet et al. | |
| 7,660,056 B1 | 2/2010 | Tang et al. | |
| 7,660,478 B2 | 2/2010 | Steinberg et al. | |
| 7,663,289 B1 | 2/2010 | Gutierrez | |
| 7,663,817 B1 | 2/2010 | Xu et al. | |
| 7,676,108 B2 | 3/2010 | Steinberg et al. | |
| 7,684,630 B2 | 3/2010 | Steinberg | |
| 7,693,311 B2 | 4/2010 | Steinberg et al. | |
| 7,693,408 B1* | 4/2010 | Tsai | 348/345 |
| 7,697,778 B2 | 4/2010 | Steinberg et al. | |
| 7,697,829 B1 | 4/2010 | Gutierrez et al. | |
| 7,697,831 B1 | 4/2010 | Tsai et al. | |
| 7,697,834 B1 | 4/2010 | Tsai | |
| 7,702,136 B2 | 4/2010 | Steinberg et al. | |
| 7,702,226 B1 | 4/2010 | Gutierrez | |
| 7,729,601 B1 | 6/2010 | Tsai | |
| 7,729,603 B2 | 6/2010 | Xu et al. | |
| 7,747,155 B1 | 6/2010 | Gutierrez | |
| 7,769,281 B1 | 8/2010 | Gutierrez | |
| 7,773,118 B2 | 8/2010 | Florea et al. | |
| 7,796,816 B2 | 9/2010 | Steinberg et al. | |
| 7,796,822 B2 | 9/2010 | Steinberg et al. | |
| 2001/0026632 A1 | 10/2001 | Tamai | |
| 2004/0090551 A1 | 5/2004 | Yata | |
| 2005/0270410 A1 | 12/2005 | Takayama | |
| 2006/0140455 A1* | 6/2006 | Costache et al. | 382/118 |
| 2006/0204034 A1 | 9/2006 | Steinberg et al. | |
| 2006/0239579 A1 | 10/2006 | Ritter | |
| 2007/0030381 A1 | 2/2007 | Maeda | |
| 2007/0110305 A1 | 5/2007 | Corcoran et al. | |
| 2007/0160307 A1 | 7/2007 | Steinberg et al. | |
| 2007/0201725 A1 | 8/2007 | Steinberg et al. | |
| 2007/0269108 A1 | 11/2007 | Steinberg et al. | |
| 2007/0285528 A1 | 12/2007 | Mise et al. | |
| 2007/0296833 A1 | 12/2007 | Corcoran et al. | |
| 2008/0013798 A1 | 1/2008 | Ionita et al. | |
| 2008/0013799 A1 | 1/2008 | Steinberg et al. | |
| 2008/0143854 A1 | 6/2008 | Steinberg et al. | |
| 2008/0175481 A1 | 7/2008 | Petrescu et al. | |
| 2008/0205712 A1 | 8/2008 | Ionita et al. | |
| 2008/0218868 A1* | 9/2008 | Hillis et al. | 382/255 |
| 2008/0219517 A1* | 9/2008 | Blonk et al. | 382/118 |
| 2008/0219581 A1 | 9/2008 | Albu et al. | |
| 2008/0220750 A1 | 9/2008 | Steinberg et al. | |
| 2008/0252773 A1 | 10/2008 | Oishi | |
| 2008/0259176 A1 | 10/2008 | Tamaru | |
| 2008/0266419 A1 | 10/2008 | Drimbarean et al. | |
| 2008/0267461 A1 | 10/2008 | Ianculescu et al. | |
| 2008/0292193 A1 | 11/2008 | Bigioi et al. | |
| 2008/0309769 A1 | 12/2008 | Albu et al. | |
| 2008/0316328 A1 | 12/2008 | Steinberg et al. | |
| 2009/0002514 A1 | 1/2009 | Steinberg et al. | |
| 2009/0003661 A1 | 1/2009 | Ionita et al. | |
| 2009/0003708 A1 | 1/2009 | Steinberg et al. | |
| 2009/0040342 A1 | 2/2009 | Steinberg et al. | |
| 2009/0052749 A1 | 2/2009 | Steinberg et al. | |
| 2009/0052750 A1 | 2/2009 | Steinberg et al. | |
| 2009/0059061 A1* | 3/2009 | Yu et al. | 348/347 |
| 2009/0080713 A1 | 3/2009 | Bigioi et al. | |
| 2009/0087042 A1 | 4/2009 | Steinberg et al. | |
| 2009/0153725 A1 | 6/2009 | Kawahara | |
| 2009/0167893 A1 | 7/2009 | Susanu et al. | |
| 2009/0179998 A1 | 7/2009 | Steinberg et al. | |
| 2009/0179999 A1 | 7/2009 | Albu et al. | |
| 2009/0185753 A1 | 7/2009 | Albu et al. | |
| 2009/0190803 A1 | 7/2009 | Neghina et al. | |
| 2009/0196466 A1 | 8/2009 | Capata et al. | |
| 2009/0208056 A1 | 8/2009 | Corcoran et al. | |
| 2009/0238410 A1 | 9/2009 | Corcoran et al. | |
| 2009/0238419 A1 | 9/2009 | Steinberg et al. | |
| 2009/0238487 A1 | 9/2009 | Nakagawa et al. | |
| 2009/0244296 A1 | 10/2009 | Petrescu et al. | |
| 2009/0245693 A1 | 10/2009 | Steinberg et al. | |
| 2009/0263022 A1 | 10/2009 | Petrescu et al. | |
| 2009/0268080 A1 | 10/2009 | Song et al. | |
| 2009/0273685 A1 | 11/2009 | Ciuc et al. | |
| 2009/0303342 A1* | 12/2009 | Corcoran et al. | 348/222.1 |
| 2009/0303343 A1 | 12/2009 | Drimbarean et al. | |
| 2009/0310885 A1* | 12/2009 | Tamaru | 382/275 |
| 2010/0014721 A1 | 1/2010 | Steinberg et al. | |
| 2010/0039525 A1 | 2/2010 | Steinberg et al. | |
| 2010/0054533 A1 | 3/2010 | Steinberg et al. | |
| 2010/0054549 A1 | 3/2010 | Steinberg et al. | |
| 2010/0060727 A1* | 3/2010 | Steinberg et al. | 348/77 |
| 2010/0066822 A1 | 3/2010 | Steinberg et al. | |
| 2010/0085436 A1 | 4/2010 | Ohno | |
| 2010/0092039 A1 | 4/2010 | Steinberg et al. | |
| 2010/0128163 A1* | 5/2010 | Nagasaka et al. | 348/348 |
| 2010/0141786 A1 | 6/2010 | Bigioi et al. | |
| 2010/0141787 A1 | 6/2010 | Bigioi et al. | |
| 2010/0165140 A1 | 7/2010 | Steinberg | |
| 2010/0165150 A1 | 7/2010 | Steinberg et al. | |
| 2010/0182458 A1 | 7/2010 | Steinberg et al. | |
| 2010/0188525 A1 | 7/2010 | Steinberg et al. | |
| 2010/0188530 A1 | 7/2010 | Steinberg et al. | |
| 2010/0188535 A1 | 7/2010 | Mitsuya et al. | |
| 2010/0194869 A1 | 8/2010 | Matsuzaki | |
| 2010/0202707 A1 | 8/2010 | Costache et al. | |
| 2010/0208091 A1* | 8/2010 | Chang | 348/222.1 |
| 2010/0220899 A1 | 9/2010 | Steinberg et al. | |
| 2010/0271494 A1 | 10/2010 | Miyasako | |
| 2010/0329582 A1 | 12/2010 | Albu et al. | |
| 2011/0135208 A1* | 6/2011 | Atanassov et al. | 382/218 |
| 2011/0249173 A1 | 10/2011 | Li et al. | |
| 2012/0075492 A1 | 3/2012 | Nanu et al. | |
| 2012/0218461 A1 | 8/2012 | Sugimoto | |

FOREIGN PATENT DOCUMENTS

| | | |
|---|---|---|
| WO | 2007093199 A2 | 8/2007 |
| WO | 2009/036793 A1 | 3/2009 |
| WO | WO2012/041892 A1 | 4/2012 |
| WO | 2012/062893 A2 | 5/2012 |
| WO | 2012/062893 A3 | 7/2012 |

(56) References Cited

FOREIGN PATENT DOCUMENTS

OTHER PUBLICATIONS

Karen P Hollingsworth, Kevin W. Bowyer, Patrick J. Flynn: "Image Averaging for Improved Iris Recognition", Advances in Biometrics, by M. Tistarelli, M.S. Nixon (Eds.): ICB 2009, LNCS 5558, Springer Berlin Heidelberg, Berlin Heidelberg, Jun. 2, 2009, pp. 1112-1121, XP019117900, ISBN: 978-3-642-01792-6.
PCT Invitation to Pay Additional Fees and, Where Applicable, Protest Fee, (PCT Article 17(3)(a) and Rule 401 and 40.2(e)), including Annex to Form PCT/ISA/206 Communication Relating to the Results of the Partial International Search, for PCT Application No. PCT/EP2011/069904, report dated Feb. 28, 2012, 6 pages.
Karen P. Hollingsworth, Kevin W. Bowyer, and Patrick J. Flynn: Image Averaging for Improved Iris Recognition, Jun. 2, 2009, Advances in Biometrics, Springer Berlin Heidelberg, Berlin, Heidelberg, pp. 1112-1121, XP019117900, ISBN: 978-3-642-01792-6.
Mitra S, et al., Gaussian Mixture Models Based on the Frequency Spectra for Human Identification and Illumination Classification, 4th IEEE Workshop on Automatic Identification Advanced Technologies, 2005, Buffalo, NY, USA Oct. 17-18, 2005, pp. 245-250.
Kouzani, A Z, Illumination-effects compensation in facial images, IEEE International Conference on Systems, Man, and Cybernetics, 1999, IEEE SMS '99 Conference Proceedings, Tokyo, Japan Oct. 12-15, 1999, vol. 6, pp. 840-844.
Turk, et al., Eigenfaces for Recognition, Journal of Cognitive Neuroscience, vol. 3, No. 1, 1991.
H. Lai, P. C. Yuen, and G. C. Feng, Face recognition using holistic Fourier invariant features, Pattern Recognition, vol. 34, pp. 95-109, 2001.
Tjahyadi et al., Application of the DCT Energy Histogram for Face Recognition, in Proceedings of the 2nd International Conference on Information Technology for Application (ICITA 2004), pp. 305-310, 2004.
Zhang Lei, Lin Fuzong, Zhang Bo, A Cbir method based on colorspatial feature. IEEE Region 10th Ann. Int. Conf. 1999, TENCON'99, Cheju, Korea, 1999.
Markus Stricker and Markus Orengo, Similarity of color images, SPIE Proc., vol. 2420, pp. 381-392, 1995.
Jing Huang, S. Ravi Kumar, Mandar Mitra, Wei-Jing Zhu, Ramin Zabih, Image Indexing Using Color Correlograms, IEEE Conf. Computer Vision and Pattern Recognition, (CVPR '97) pp. 762-768, 1997.
S. J. Wan, P. Prusinkiewicz, S. L. M. Wong, Variance-based color image quantization for frame buffer display, Color Research and Application, vol. 15, No. 1, pp. 52-58, 1990.
Tianhorng Chang and C.-C. Jay Kuo, Texture Analysis and Classification with Tree-Structured Wavelet Transform, IEEE Trans. Image Processing, vol. 2. No. 4, Oct. 1993.

U.S. Appl. No. 12/820,086, filed Jun. 21, 2010.
U.S. Appl. No. 12/820,034, filed Jun. 21, 2010.
U.S. Appl. No. 12/901,577, filed Oct. 11, 2010.
PCT Communication in Cases for Which No Other Form is Applicable, Form PCT/ISA/224, for PCT Application No. PCT/EP2011/069904, dated Jun. 22, 2012, 1 Page.
PCT Notification of Transmittal of the International Search Report and the Written Opinion of the International Searching Authority, or the Declaration, for PCT Application No. PCT/EP2011/069904, report dated Jun. 22, 2012, 21 Pages.
Sang Ku Kim, Sang Rae Park and Joan Ki Paik: Simultaneous Out-Of-Focus Blur Estimation and Restoration for Digital Auto-Focusing System, Aug. 1, 1998, vol. 44, No. 3, pp. 1071-1075, XP011083715.
Hamm P., Schulz J. and Englmeier K.-H.: "Content-Based Autofocusing in Automated Microscopy", Image Analysis Stereology, vol. 29, Nov. 1, 2010, pp. 173-180, XP002677721.
Co-pending U.S. Appl. No. 13/020,805, filed Feb. 3, 2011.
Wikipedia reference: Autofocus, retrieved on Feb. 3, 2011, URL: http://en.wikipedia.org/wiki/Autofocus, 5 Pages.
Wei Huang, Zhongliang Jing, Evaluation of focus measures in multi-focus image fusion, Pattern Recognition Letters, Mar. 2007, vol. 28, No. 4, p. 493-500.
Mohsen Ebrahimi Moghaddam, Out of Focus Blur Estimation Using Genetic Algorithm, Journal of Computer Science 4 (4): 298-304, 2008, Science Publications, ISSN 1549-3636.
M. E. Moghaddam, Out of focus blur estimation using genetic algorithm, in Proc. 15th International Conf. on Systems, Signals and Image Processing, IWSSIP 2008, pp. 417-420.
K. Sauer and B. Schwartz, Efficient Block Motion Estimation Using Integral Projections, IEEE Trans. Circuits, Systems for video Tech., 1996, vol. 6, No. 5, October, pp. 513-518.
Non-Final Rejection, dated Apr. 15, 2013, for U.S. Appl. No. 121944,703, filed Nov. 11, 2010.
Non-Final Rejection, dated Apr. 5, 2013, for U.S. Appl. No. 13/020,805, filed Feb. 3, 2011.
Non-Final Rejection, dated Mar. 27, 2013, for U.S. Appl. No. 12/959,320, filed Dec. 2, 2010.
Notice of Allowance, dated Jul. 10, 2013, for U.S. Appl. No. 13/020,805, filed Feb. 3, 2011.
PCT Notification of Transmittal of International Preliminary Report on Patentability Chapter I, International Preliminary Report on Patentability Chapter I, for PCT Application No. PCT/EP2011/066835, report dated Apr. 11, 2013, 9, Pages.
Paul Viola and Michael Jones: Rapid Object Detection using a Boosted Cascade of Simple Features, 2001 IEEE, pp. I-511-I-518.
Paul Viola and Michael J. Jones: Robust Real-Time Face Detection, International Journal of Computer Vision 57(2), 137-154, 2004 Kluwer Academic Publishers. Manufactured in The Netherlands, pp. 137-154.

\* cited by examiner

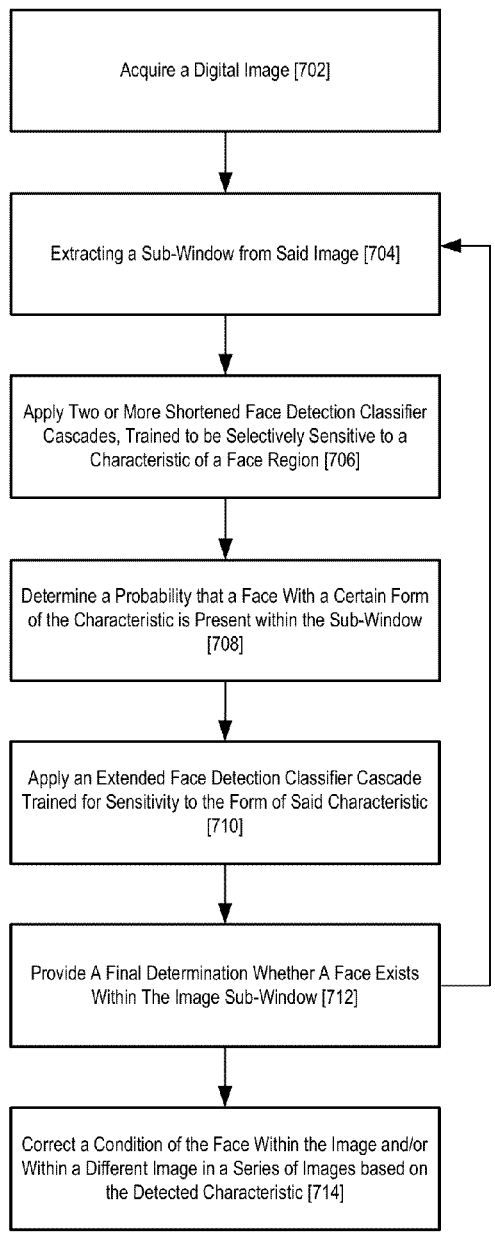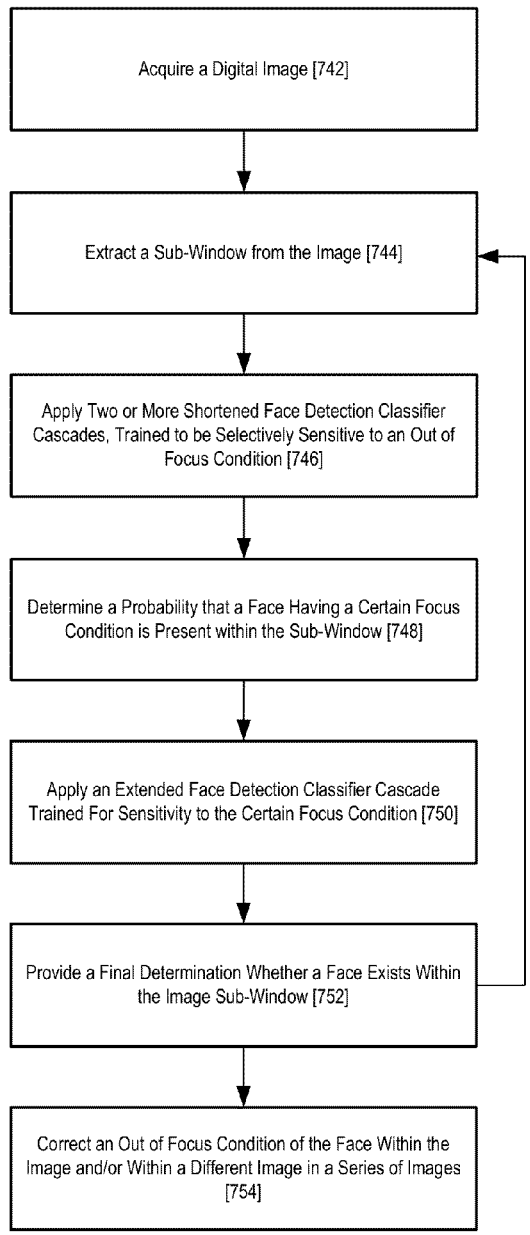
Figure 9A  Figure 9B

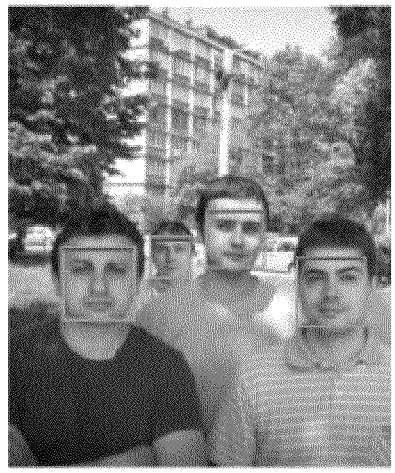
Figure 11A
EMBEDDED:
1. face detection
2. focus on each face and save each image
3. save all images in the same JPG file, as different thumbs
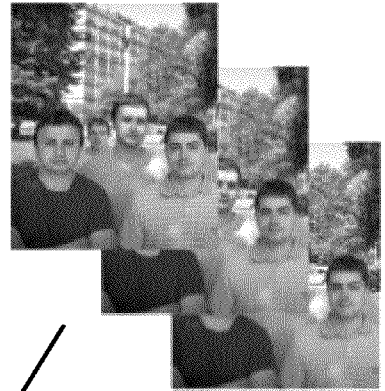
Figure 11B
PC:
- Choose the focus on different persons
  
Figure 11C   Figure 11D   Figure 11E

RAPID AUTO-FOCUS USING CLASSIFIER CHAINS, MEMS AND/OR MULTIPLE OBJECT FOCUSING

RELATED APPLICATIONS

This application is related to a contemporaneously filed application of the same TITLE by the same inventors and assignee having application Ser. No. 12/944,703.

BACKGROUND OF THE INVENTION

1. Field of the Invention

The invention relates to face detection and recognition, particularly under out of focus conditions 2. Description of the Related Art Viola-Jones proposes a classifier chain consisting of a series of sequential feature detectors. The classifier chain rejects image patterns that do not represent faces and accepts image patterns that do represent faces.

A problem in face recognition processes arises when faces that are out of focus are distributed in a large area of face space making correct classification difficult. Faces with similar focus conditions tend to be clustered together and correct clustering of images of the same person is difficult. It is desired to be able to detect faces that are out of focus within images, or where another difficult characteristic of a face exists such as a face having a non-frontal pose or uneven illumination. It is also desired to have a method to normalize focus on faces, for example, for use in face recognition and/or other face-based applications.

Each of Mitra S et al "Gaussian Mixture Models Based on the Frequency Spectra for Human Identification and Illumination Classification", 4$^{th}$ IEEE Workshop on Automatic Identification Advanced Technologies, 2005, Buffalo, N.Y., USA 17-18 Oct. 2005, pages 245-250; and Kouzani A Z "Illumination-effects compensation in facial images", IEEE International Conference on Systems, Man, and Cybernetics, 1999, IEEE SMS '99 Conference Proceedings, Tokyo, Japan 12-15 Oct., 1999, vol 6 pages 840-844 disclose conventional face illumination normalization methods.

Having objects at different distances to a digital camera, or a camera-phone, video camera, or other camera-enabled device or image acquisition device, in focus is a well known problem in the digital photography industry. Solutions such as extended depth of field do tackle this problem, but only partially, ensuring that the close objects are still sharp when the camera focuses to infinity (deep focus). It is desired to have an efficient technique to handle digital images initially having out of focus objects.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9A-9B illustrate face detection methods in accordance with certain embodiments.

FIGS. 11A-11E illustrate a further technique in accordance with certain embodiments.

DETAILED DESCRIPTIONS OF THE EMBODIMENTS

Figure 1:
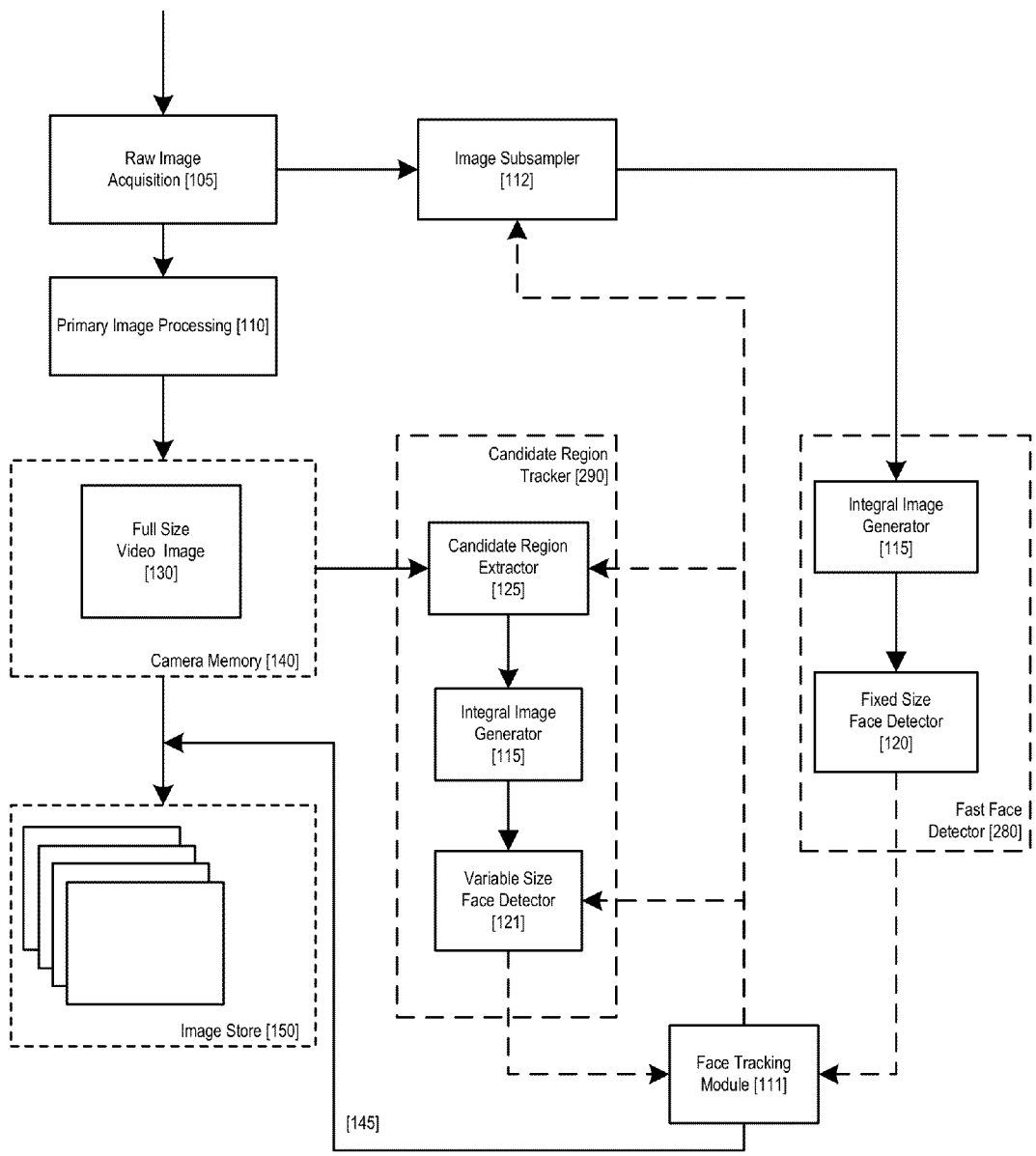
FIG. 1 is a block diagram illustrating the principle components of an image processing apparatus according to a preferred embodiment of the present invention.

A method of digital image processing using face or other object detection is provided. A scene is acquired with a digital image acquisition device including multiple features. A first group of pixels is identified that corresponds to a first feature within the scene. An optic is adjusted in real time using a MEMS component to a first focus position to focus the device on the first feature. A first digital image is captured at the first focus position. A second group of pixels is identified that corresponds to a second feature within approximately the same scene. The optic is adjusted in real time using the MEMS component to a second focus position to focus the device on the second feature. A second digital image is captured at the second focus position. The first and second digital images are registered including the first and second features. The first and second digital images are stored, transmitted, captured, combined and/or displayed together.

The method may include determining that the first feature appears blurry in the second digital image and/or that the second feature appears blurry in the first image. The storing, transmitting, combining, capturing and/or displaying of the first and second digital images together may involve generating a composite image including the first feature from the first digital image and the second feature from the second digital image, such that both of the first and second features appear to be sharp in the composite image. The generating a composite image may involve blending and/or morphing the first and second images.

The storing, capturing, combining, transmitting or displaying of the first and second digital images together may include providing a toggle feature to call the first and second digital images together and toggle between them. A selection of one of the first and second digital images may be received for further storing, transmitting, displaying and/or further processing. The toggle feature may permit a display to appear to demonstrate toggling between the first and second focus positions in a same image.

The registering may include aligning the first and second digital images by applying digital or mechanical image stabilization. The identifying of the first or second groups of pixels respectively may include applying face detection to the acquired scene and identifying the first or second features as corresponding to first or second faces. The method may include applying face tracking to the first and/or second group of pixels for respectively continuing to identify in subsequent images the first and/or second groups of pixels as corresponding to the first and/or second face.

A further method is provided for smart-focusing on a detected face region in a scene. The method includes acquiring a digital image using a camera-enabled device including a lens, an image sensor, a memory and a processor. A group of pixels is identified that contain a face, and a focus-generic classifier chain trained to match both focused and unfocused faces is applied and/or data is accepted from a face tracking module. Multiple focus-specific classifier chains are applied, including a first chain trained to match substantially out of focus faces, and a second chain trained to match slightly out of focus faces. When the face is determined not to be sharply focused as significantly matching the first and/or second focus-specific classifier chains, the focus position is adjusted using a MEMS component one or more times based on a degree of focus determined at one or more preceding focus positions, such as to ultimately focus on the face using a series of one or more selected smart-focus adjustments based on application of focus-specific classifier chains.

When the face is determined to be substantially unfocused as best matching the first focus-specific classifier chain, then the adjusting may include coarsely adjusting to a second focus position and repeating the applying of the multiple focus-specific classifier chains.

When the face is determined to be substantially unfocused at the second focus position, then the method may further include coarsely adjusting focus to a third focus position oppositely as the adjusting to the second focus position in a reduced and/or increased amount as the adjusting to the second focus position.

The multiple focus-specific classifier chains may include a third focus-specific classifier chain trained to match sharply focused faces. When the face is determined to be slightly unfocused as best matching the second focus-specific classifier chain, then the adjusting may include finely adjusting to a second focus position and repeating the applying of the at least three focus-specific classifier chains one or more times until a best match is achieved with the third focus-specific classifier chain.

When the face is determined to be slightly unfocused as best matching the second focus-specific classifier chain, then the adjusting may include finely adjusting to a second focus position and repeating the applying of the second focus-specific classifier chain until a focus position is achieved between two slightly unfocused positions in front of and behind the face.

The multiple focus-specific classifier chains may include a third focus-specific classifier chain trained to match sharply focused faces. When the face is determined to be slightly unfocused as best matching the second focus-specific classifier chain, then the adjusting may include finely adjusting to a second focus position and repeating the applying of the multiple focus-specific classifier chains one or more times until a best match is achieved with the third focus-specific classifier chain.

When the face is determined to be slightly unfocused as best matching the second focus-specific classifier chain, then the adjusting may include finely adjusting to a second focus position and repeating the applying of the second focus-specific classifier chain until a focus position is achieved between two slightly unfocused positions in front of and behind the face.

The method may further include applying one or more specific facial feature classifier chains each trained to enable optimal focus on a feature of the detected face including one or both eyes, mouth, chin, nose, one or both ears, hairline, forehead, profile or other partial face region, or combinations thereof. The method may include adjusting focus position to obtain optimal focus on a selected specific facial feature of the detected face.

The applying of at least one of the multiple focus-specific classifier chains may be repeated at each focus position.

A focus normalization method is also provided. A digital image is acquired including data corresponding to a face that appears to be out of focus. One or more out of focus classifier programs are applied to the face data, and the face data is identified as corresponding to a face. An out of focus condition is also determined for the face as a result of the applying of the one or more out of focus classifier programs. The out of focus condition of the face is corrected based on the determining to thereby generate a corrected face image appearing to be sharply focused. The method also includes electronically storing, transmitting, capturing, applying a face recognition program to, editing, or displaying the corrected face image, or combinations thereof.

A face recognition program may be applied to the corrected face image. The detecting of the face and the determining of the focus condition of the face may be performed simultaneously. A set of feature detector programs may be applied to reject non-face data from being identified as face data.

A sharply focused classifier program may be also applied to the face data. A focus condition may be determined based on acceptance of the face data by one of the focus condition classifier programs. The digital image may be one of multiple images in a series that include the face, and the correcting may be applied to a different image in the series than the digital image within which the focus condition is determined.

The out of focus classifier programs may include one or more slightly out of focus classifiers and/or one or more significantly out of focus classifiers. A sharply focused classifier program may be applied to the face data. Two or more full classifier sets may be applied after determining that no single focus condition applies and that the face data is not rejected as a face.

A face detection method is also provided. The face detection method includes acquiring a digital image and extracting a sub-window from the image. Two or more shortened face detection classifier cascades are applied that are trained to be selectively sensitive to a characteristic of a face region. A probability is determined that a face with a certain form of the characteristic is present within the sub-window. An extended face detection classifier cascade is applied that is trained for sensitivity to the certain form of the characteristic. A final determination is provided that a face exists within the image sub-window. The method is repeated one or more times for one or more further sub-windows from the image and/or one or more further characteristics.

The characteristic or characteristics may include a focus condition such as shrply focused, slightly out of focus and/or significantly out of focus, directional illumination of the face region, an in-plane rotation of the face region, a 3D pose variation of the face region. a degree of smile, a degree of eye-blinking, a degree of eye-winking, a degree of mouth opening, facial blurring, eye-defect, facial shadowing, facial occlusion, facial color, or facial shape, or combinations thereof.

A focus condition of a face may be determined within a sub-window based on acceptance by one of the focus condition classifier cascades. The digital image may be one of multiple images in a series that include the face, and an out of focus condition of the face may be corrected within a different image in the series than the digital image within which the focus condition is determined. An out of focus classifier cascade may include one or more slightly out of focus and/or significantly out of focus classifiers.

A further face detection method is provided that includes acquiring a digital image and extracting a sub-window from said image. Two or more shortened face detection classifier cascades may be applied that are trained to be selectively sensitive to a focus condition of a face or other object of interest. A probability may be determined that a face having a certain focus condition is present within the sub-window. An extended face detection classifier cascade may be applied that is trained for sensitivity to the certain focus condition. A final determination is provided that a face exists within the image sub-window. The method may be repeated one or more times for one or more further sub-windows from the image and/or one or more further focus conditions.

The digital image may be one of multiple images in a series that include the face, and an out of focus condition of the face may be corrected within a different image in the series than the digital image within which the focus condition is determined.

The out of focus classifier cascades may include one or more slightly out of focus classifiers and/or one or more significantly out of focus classifiers. A sharply focused classifier cascade may also be applied. A focus condition of a face may be determined within a sub-window based on acceptance by one of the classifier cascades.

A digital image acquisition device is also provided including an optoelectonic system, e.g., including a lens and image sensor, for acquiring a digital image, and a digital memory having stored therein processor-readable code for programming the processor to perform any of the methods described herein.

One or more non-transitory processor-readable storage media having code embedded therein are also provided for programming one or more processors to perform any of the methods described herein.

FIG. 1 illustrates subsystems of a face detection and tracking system according to certain embodiments. The solid lines indicate the flow of image data; the dashed line indicates control inputs or information outputs (e.g. location(s) of detected faces) from a module. In this example an image processing apparatus can be a digital still camera (DSC), a video camera, a cell phone equipped with an image capturing mechanism or a hand held computer equipped with an internal or external camera.

A digital image is acquired in raw format from an image sensor (CCD or CMOS) [105] and an image subsampler [112] generates a smaller copy of the main image. A digital camera may contain dedicated hardware subsystems to perform image subsampling, for example, to provide preview images to a camera display and/or camera processing components. The subsampled image may be provided in bitmap format (RGB or YCC). In the meantime, the normal image acquisition chain performs post-processing on the raw image [110] which may include some luminance and color balancing. In certain digital imaging systems, subsampling may occur after post-processing, or after certain post-processing filters are applied, but before the entire post-processing filter chain is completed.

The subsampled image is next passed to an integral image generator [115] which creates an integral image from the subsampled image. This integral image is next passed to a fixed size face detector [120]. The face detector is applied to the full integral image, but as this is an integral image of a subsampled copy of the main image, the processing required by the face detector may be proportionately reduced. If the subsample is ¼ of the main image, then this implies that the processing time is only 25% of that for the full image.

This approach is particularly amenable to hardware embodiments where the subsampled image memory space can be scanned by a fixed size DMA window and digital logic to implement a Haar-feature classifier chain can be applied to this DMA window. However, certain embodiment may use one or more different sizes of classifier or several sizes of classifier (e.g., in a software embodiment), or multiple fixed-size classifiers may be used (e.g., in a hardware embodiment). An advantage is that a smaller integral image is calculated.

After application of the fast face detector [280], newly detected candidate face regions [141] may be passed onto a face tracking module [111] when it is desired to use face tracking, where one or more face regions confirmed from previous analysis [145] may be merged with the new candidate face regions prior to being provided [142] to a face tracker [290].

The face tracker [290] provides a set of confirmed candidate regions [143] back to the tracking module [111]. Additional image processing filters are applied by the tracking module [111] to confirm either that these confirmed regions [143] are face regions or to maintain regions as candidates if they have not been confirmed as such by the face tracker [290]. A final set of face regions [145] can be output by the module [111] for use elsewhere in the camera or to be stored within or in association with an acquired image for later processing either within the camera or offline; as well as to be used in the next iteration of face tracking.

After the main image acquisition chain is completed a full-size copy of the main image [130] will normally reside in the system memory [140] of the image acquisition system. This may be accessed by a candidate region extractor [125] component of the face tracker [290] which selects image patches based on candidate face region data [142] obtained from the face tracking module [111]. These image patches for each candidate region are passed to an integral image generator [115] which passes the resulting integral images to a variable-sized detector [121], as one possible example a VJ detector, which then applies a classifier chain, preferably at least a 32 classifier chain, but fewer than 32 are used in some embodiments, to the integral image for each candidate region across a range of different scales.

The range of scales [144] employed by the face detector [121] is determined and supplied by the face tracking module [111] and is based partly on statistical information relating to the history of the current candidate face regions [142] and partly on external metadata determined from other subsystems within the image acquisition system.

As an example of the former, if a candidate face region has remained consistently at a particular size for a certain number of acquired image frames then the face detector [121] may be applied at this particular scale and perhaps at one scale higher (i.e. 1.25 time larger) and one scale lower (i.e. 1.25 times lower).

As an example of the latter, if the focus of the image acquisition system has moved to infinity, then the smallest scalings would be applied in the face detector [121]. Normally these scalings would not be employed because they are applied a greater number of times to the candidate face region in order to cover it completely. The candidate face region will have a minimum size beyond which it should not decrease, and this is in order to allow for localized movement of the camera by a user between frames. In some image acquisition systems which contain motion sensors it may be possible to track such localized movements and this information may be employed to further improve the selection of scales and the size of candidate regions.

The candidate region tracker [290] provides a set of confirmed face regions [143] based on full variable size face detection of the image patches to the face tracking module [111]. Clearly, some candidate regions will have been confirmed while others will have been rejected and these can be explicitly returned by the tracker [290] or can be calculated by the tracking module [111] by analyzing the difference between the confirmed regions [143] and the candidate regions [142]. In either case, the face tracking module [111] can then apply alternative tests to candidate regions rejected by the tracker [290] (as explained below) to determine whether these should be maintained as candidate regions [142] for the next cycle of tracking or whether these should indeed be removed from tracking.

Once the set of confirmed candidate regions [145] has been determined by the face tracking module [111], the module [111] communicates with the sub-sampler [112] to determine when the next acquired image is to be sub-sampled and so provided to the detector [280] and also to provide the resolution [146] at which the next acquired image is to be sub-sampled.

It will be seen that where the detector [280] does not run when the next image is acquired, the candidate regions [142] provided to the extractor [125] for the next acquired image will be the regions [145] confirmed by the tracking module [111] from the last acquired image. On the other hand, when the face detector [280] provides a new set of candidate regions [141] to the face tracking module [111], these candidate regions are merged with the previous set of confirmed regions [145] to provide the set of candidate regions [142] to the extractor [125] for the next acquired image.

Figure 2:
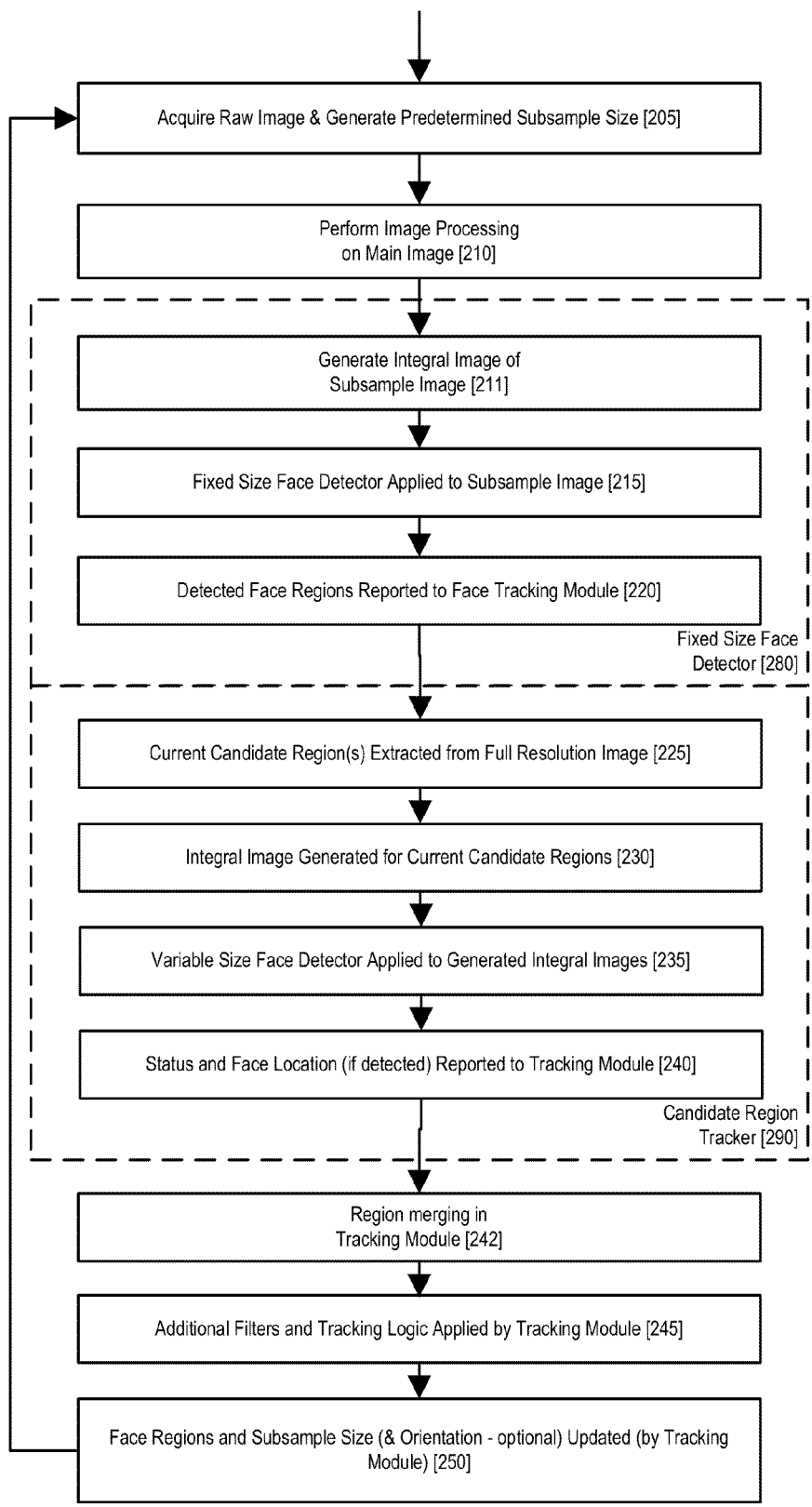
FIG. 2 is a flow diagram illustrating the operation of the image processing apparatus of FIG. 1.

FIG. 2 illustrates a exemplary workflow. The illustrated process is split into (i) a detection/initialization phase which finds new candidate face regions [141] using the fast face detector [280] which operates on a subsampled version of the full image; (ii) a secondary face detection process [290] which operates on extracted image patches for the candidate regions [142], which are determined based on the location of faces in one or more previously acquired image frames and (iii) a main tracking process which computes and stores a statistical history of confirmed face regions [143]. Although the application of the fast face detector [280] is illustrated as occurring prior to the application of the candidate region tracker [290], the order is not critical and the fast detection is not necessarily executed on every frame and in certain circumstances may be spread across multiple frames. Also, face detection may be used for various applications such as face recognition whether or not face tracking is also used.

In step 205, the main image is acquired and in step 210 primary image processing of that main image is performed as described in relation to FIG. 1. The sub-sampled image is generated by the subsampler [112] and an integral image is generated therefrom by the generator [115], step 211 as described previously. The integral image is passed to the fixed size face detector [120] and the fixed size window provides a set of candidate face regions [141] within the integral image to the face tracking module, step 220. The size of these regions is determined by the sub-sampling scale [146] specified by the face tracking module to the sub-sampler and this scale is based on the analysis of the previous sub-sampled/integral images by the detector [280] and patches from previous acquired images by the tracker [290] as well as other inputs such as camera focus and movement.

The set of candidate regions [141] is merged with the existing set of confirmed regions [145] to produce a merged set of candidate regions [142] to be provided for confirmation, step 242. For the candidate regions [142] specified by the face tracking module 111, the candidate region extractor [125] extracts the corresponding full resolution patches from an acquired image, step 225. An integral image is generated for each extracted patch, step 230 and variable-sized face detection is applied by the face detector 121 to each such integral image patch, for example, a full Viola-Jones analysis. These results [143] are in turn fed back to the face-tracking module [111], step 240.

The tracking module [111] processes these regions [143] further before a set of confirmed regions [145] is output. In this regard, additional filters can be applied by the module 111 either for regions [143] confirmed by the tracker [290] or for retaining candidate regions [142] which may not have been confirmed by the tracker 290 or picked up by the detector [280], step 245.

For example, if a face region had been tracked over a sequence of acquired images and then lost, a skin prototype could be applied to the region by the module [111] to check if a subject facing the camera had just turned away. If so, this candidate region could be maintained for checking in the next acquired image to see if the subject turns back to face the camera. Depending on the sizes of the confirmed regions being maintained at any given time and the history of their sizes, e.g. whether they are getting bigger or smaller, the module 111 determines the scale [146] for sub-sampling the next acquired image to be analyzed by the detector [280] and provides this to the sub-sampler [112], step 250.

The fast face detector [280] need not run on every acquired image. So for example, where only a single source of sub-sampled images is available, if a camera acquires 60 frames per second, 15-25 sub-sampled frames per second (fps) may be required to be provided to the camera display for user previewing. These images are sub-sampled at the same scale and at a high enough resolution for the display. Some or all of the remaining 35-45 fps can be sampled at the scale determined by the tracking module [111] for face detection and tracking purposes.

The decision on the periodicity in which images are being selected from the stream may be based on a fixed number or alternatively be a run-time variable. In such cases, the decision on the next sampled image may be determined on the processing time it took for the previous image, in order to maintain synchronicity between the captured real-time stream and the face tracking processing. Thus in a complex image environment the sample rate may decrease.

Alternatively, the decision on the next sample may also be performed based on processing of the content of selected images. If there is no significant change in the image stream, the full face tracking process might not be performed. In such cases, although the sampling rate may be constant, the images will undergo a simple image comparison and only if it is decided that there is justifiable differences, will the face tracking algorithms be launched.

It will also be noted that the face detector [280] may run at regular or irregular intervals. So for example, if the camera focus is changed significantly, then the face detector may be run more frequently and particularly with differing scales of sub-sampled image to try to detecting faces which should be changing in size. Alternatively, where focus is changing rapidly, the detector [280] could be skipped for intervening frames, until focus has stabilised. However, it is generally only when focus goes to infinity that the highest resolution integral image is produced by the generator [115].

In this latter case, the detector in some embodiments may not be able to cover the entire area of the acquired, sub-sampled, image in a single frame. Accordingly the detector may be applied across only a portion of the acquired, sub-sampled, image on a first frame, and across the remaining portion(s) of the image on subsequent acquired image frames. In one embodiment, the detector is applied to the outer regions of the acquired image on a first acquired image frame in order to catch small faces entering the image from its periphery, and on subsequent frames to more central regions of the image.

An alternative way of limiting the areas of an image to which the face detector 120 is to be applied comprises identifying areas of the image which include skin tones. U.S. Pat. No. 6,661,907, discloses one such technique for detecting skin tones and subsequently only applying face detection in regions having a predominant skin color.

In one embodiment, skin segmentation 190 is preferably applied to the sub-sampled version of the acquired image. If the resolution of the sub-sampled version is not sufficient, then a previous image stored at image store 150 or a next sub-sampled image are preferably used when the two images are not too different in content from the current acquired image. Alternatively, skin segmentation 190 can be applied to the full size video image 130.

In any case, regions containing skin tones are identified by bounding rectangles and these bounding rectangles are provided to the integral image generator 115 which produces integral image patches corresponding to the rectangles in a manner similar to the tracker integral image generator 115.

Not alone does this approach reduce the processing overhead associated with producing the integral image and running face detection, but in certain embodiments, it also allows the face detector 120 to apply more relaxed face detection to the bounding rectangles, as there is a higher chance that these skin-tone regions do in fact contain a face. So for a VJ detector 120, a shorter classifier chain can be employed to more effectively provide similar quality results to running face detection over the whole image with longer VJ classifiers required to positively detect a face.

Further improvements to face detection are also possible. For example, it has been found that face detection is significantly dependent on focus conditions and on illumination conditions and so small variations in focus and/or illumination can cause face detection to fail, causing somewhat unstable detection behavior.

In one embodiment, confirmed face regions 145 are used to identify regions of a subsequently acquired subsampled image on which focus and/or luminance correction should be performed to bring the regions of interest of the image to be analyzed to the desired parameters. One example of such correction is to improve the focus and/or luminance contrast within the regions of the subsampled image defined by the confirmed face regions 145.

Contrast enhancement may be used to increase the local contrast of an image, especially when the usable data of the image is represented by close contrast values. Through this adjustment, the intensities for pixels of a region when represented on a histogram which would otherwise be closely distributed can be better distributed. This allows for areas of lower local contrast to gain a higher contrast without affecting the global contrast. Histogram equalization accomplishes this by effectively spreading out the most frequent intensity values.

The method is useful in images with backgrounds and foregrounds that are both bright or both dark. In particular, the method can lead to better detail in photographs that are over or under-exposed. Alternatively, focus and/or luminance correction could be included in the computation of an "adjusted" integral image in the generators 115.

In another improvement, when face detection is being used, the camera application is set to dynamically modify the exposure from the computed default to a higher values (from frame to frame, slightly overexposing the scene) until the face detection provides a lock onto a face. In a separate embodiment, the face detector 120 will be applied to the regions that are substantively different between images. Note that prior to comparing two sampled images for change in content, a stage of registration between the images may be needed to remove the variability of changes in camera, caused by camera movement such as zoom, pan and tilt.

It is possible to obtain zoom information from camera firmware and it is also possible using software techniques which analyze images in camera memory 140 or image store 150 to determine the degree of pan or tilt of the camera from one image to another.

In one embodiment, the acquisition device is provided with a motion sensor 180, as illustrated in FIG. 1, to determine the degree and direction of pan from one image to another so avoiding the processing requirement of determining camera movement in software. Motion sensors may be incorporated in digital cameras, e.g., based on accelerometers, but optionally based on gyroscopic principals, primarily for the purposes of warning or compensating for hand shake during main image capture. In this context, U.S. Pat. No. 4,448,510, Murakoshi, discloses such a system for a conventional camera, or U.S. Pat. No. 6,747,690, Molgaard, discloses accelerometer sensors applied within a modern digital camera.

Where a motion sensor is incorporated in a camera, it may be optimized for small movements around the optical axis. The accelerometer may incorporate a sensing module which generates a signal based on the acceleration experienced and an amplifier module which determines the range of accelerations which can effectively be measured. The accelerometers may allow software control of the amplifier stage which allows the sensitivity to be adjusted.

The motion sensor 180 could equally be implemented with MEMS sensors of the sort which will be incorporated in next generation consumer cameras and camera-phones. In any case, when the camera is operable in face tracking mode, i.e. constant video acquisition as distinct from acquiring a main image, shake compensation might not be used because image quality is lower. This provides the opportunity to configure the motion sensor 180, to sense large movements, by setting the motion sensor amplifier module to low gain. The size and direction of movement detected by the sensor 180 is provided to the face tracker 111. The approximate size of faces being tracked is already known and this enables an estimate of the distance of each face from the camera. Accordingly, knowing the approximate size of the large movement from the sensor 180 allows the approximate displacement of each candidate face region to be determined, even if they are at differing distances from the camera.

Thus, when a large movement is detected, the face tracker 111 shifts the location of candidate regions as a function of the direction and size of the movement. Alternatively, the size of the region over which the tracking algorithms are applied may also be enlarged (and, if necessary, the sophistication of the tracker may be decreased to compensate for scanning a larger image area) as a function of the direction and size of the movement.

When the camera is actuated to capture a main image, or when it exits face tracking mode for any other reason, the amplifier gain of the motion sensor 180 is returned to normal, allowing the main image acquisition chain 105,110 for full-sized images to employ normal shake compensation algorithms based on information from the motion sensor 180. In alternative embodiments, sub-sampled preview images for the camera display can be fed through a separate pipe than the images being fed to and supplied from the image sub-sampler [112] and so every acquired image and its sub-sampled copies can be available both to the detector as well as for camera display.

In addition to periodically acquiring samples from a video stream, the process may also be applied to a single still image acquired by a digital camera. In this case, the stream for the face tracking comprises a stream of preview images and the final image in the series is the full resolution acquired image. In such a case, the face tracking information can be verified for the final image in a similar fashion to that illustrated in FIG. 2. In addition, the information such as coordinates or mask of the face may be stored with the final image. Such data for example may fit as an entry in the saved image header, for future post processing, whether in the acquisition device or at a later stage by an external device.

Figure 3A:
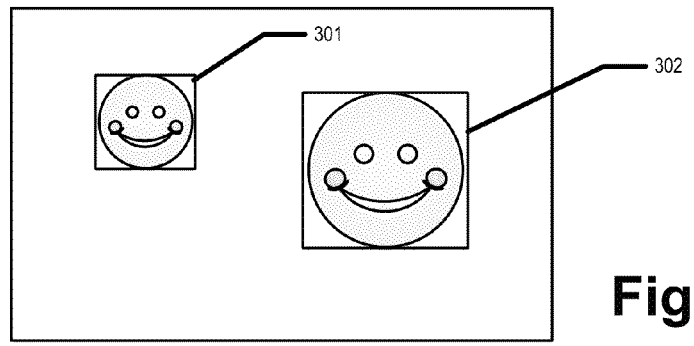
FIGS. 3A-3D shows examples of images processed by the apparatus of the preferred embodiment.

FIGS. 3A-3D illustrate operations of certain embodiments through worked examples. FIG. 3A illustrates the result at the end of a detection & tracking cycle on a frame of video or a still within a series of stills, and two confirmed face regions [301, 302] of different scales are shown. In this embodiment, for pragmatic reasons, each face region has a rectangular bounding box, as it is easier to make computations on rectangular regions. This information is recorded and output as [145] by the tracking module [111] of FIG. 1. Based on the history of the face regions [301,302], the tracking module [111] may decide to run fast face tracking with a classifier window of the size of face region [301] with an integral image being provided and analyzed accordingly.

Figure 3B:
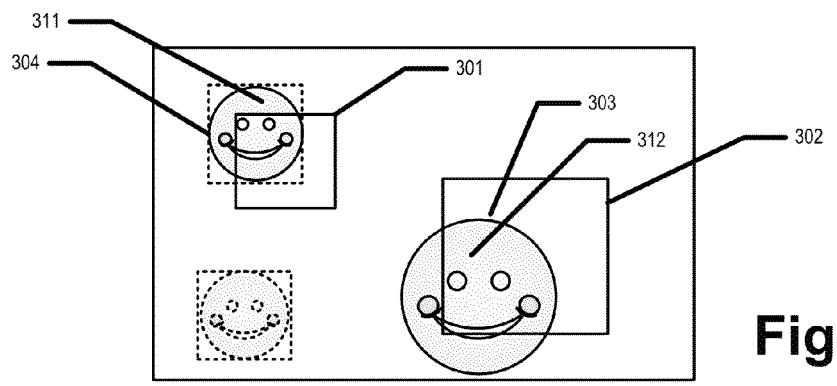

FIG. 3B illustrates the situation after the next frame in a video sequence is captured and the fast face detector has been applied to the new image. Both faces have moved [311, 312] and are shown relative to previous face regions [301, 302]. A third face region [303] has appeared and has been detected by the fast face detector [303]. In addition the fast face detector has found the smaller of the two previously confirmed faces [304] because it is at the correct scale for the fast face detector. Regions [303] and [304] are supplied as candidate regions to the tracking module [111]. The tracking module merges this new candidate region information [141], with the previous confirmed region information [145] comprising regions [302] to provide a set of candidate regions comprising regions [303], [304] and [302] to the candidate region extractor [290]. The tracking module [111] knows that the region [302] has not been picked up by the detector [280]. This may be because the face has disappeared, remains at a size that could not have been detected by the detector [280] or has changed size to a size that could not have been detected by the detector [280]. Thus, for this region, the module [111] will specify a large patch [305].

Figure 3C:
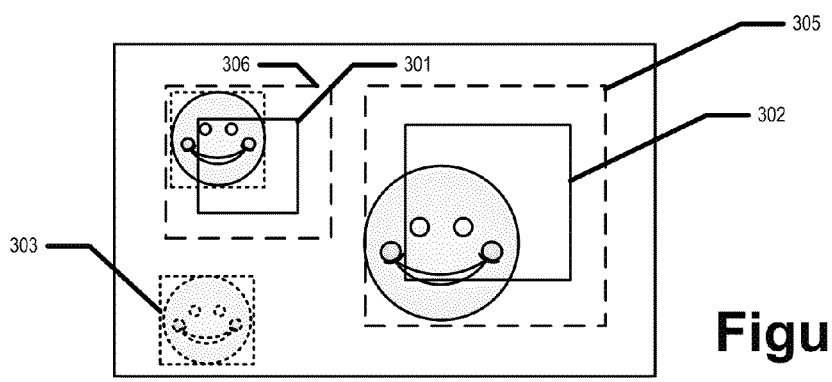

The large patch 305 may be as illustrated at FIG. 3C around the region [302] to be checked by the tracker [290]. Only the region [303] bounding the newly detected face candidate needs to be checked by the tracker [290], whereas because the face [301] is moving a relatively large patch [306] surrounding this region is specified to the tracker [290].

FIG. 3C illustrates the situation after the candidate region extractor operates upon the image, candidate regions [306, 305] around both of the confirmed face regions [301, 302] from the previous video frame as well as new region [303] are extracted from the full resolution image [130]. The size of these candidate regions has been calculated by the face tracking module [111] based partly on partly on statistical information relating to the history of the current face candidate and partly on external metadata determined from other sub-systems within the image acquisition system. These extracted candidate regions are now passed on to the variable sized face detector [121] which applies a VJ face detector to the candidate region over a range of scales. The locations of one or more confirmed face regions, if any, are then passed back to the face tracking module [111].

Figure 3D:
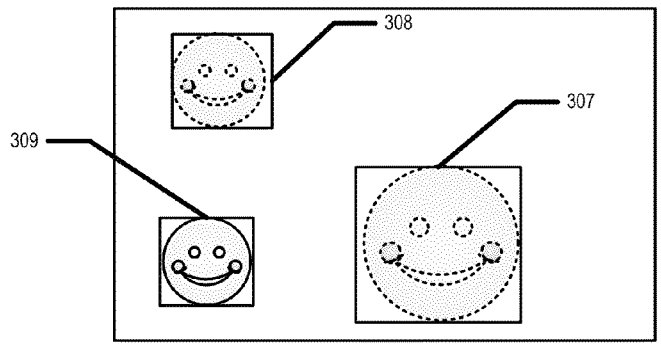

FIG. 3D illustrates the situation after the face tracking module [111] has merged the results from both the fast face detector [280] and the face tracker [290] and applied various confirmation filters to the confirmed face regions. Three confirmed face regions have been detected [307, 308, 309] within the patches [305, 306, 303]. The largest region [307] was known but had moved from the previous video frame and relevant data is added to the history of that face region. The other previously known region [308] which had moved was also detected by the fast face detector which serves as a double-confirmation and these data are added to its history. Finally, a new face region [303] was detected and confirmed and a new face region history must be initiated for this newly detected face. These three face regions are used to provide a set of confirmed face regions [145] for the next cycle.

There are many possible applications for the regions 145 supplied by the face tracking module. For example, the bounding boxes for each of the regions [145] can be superimposed on the camera display to indicate that the camera is automatically tracking detected face(s) in a scene. This can be used for improving various pre-capture parameters. One example is exposure, ensuring that the faces are well exposed. Another example is auto-focusing, by ensuring that focus is set on a detected face or indeed to adjust other capture settings for the optimal representation of the face in an image.

The corrections may be done as part of the pre-processing adjustments. The location of the face tracking may also be used for post processing and in particular selective post processing where the regions with the faces may be enhanced. Such examples include sharpening, enhancing saturation, brightening or increasing local contrast. The preprocessing using the location of faces may also be used on the regions without the face to reduce their visual importance, for example through selective blurring, de-saturation, or darkening.

Where several face regions are being tracked, then the longest lived or largest face can be used for focusing and can be highlighted as such. Also, the regions [145] can be used to limit the areas on which for example red-eye processing is performed when required. Other post-processing which can be used in conjunction with the light-weight face detection described above is face recognition. In particular, such an approach can be useful when combined with more robust face detection and recognition either running on the same or an off-line device that has sufficient resources to run more resource consuming algorithms.

In this case, the face tracking module [111] reports the location of any confirmed face regions to the in-camera firmware, preferably together with a confidence factor. When the confidence factor is sufficiently high for a region, indicating that at least one face is in fact present in an image frame, the camera firmware runs a light-weight face recognition algorithm [160] at the location of the face, for example a DCT-based algorithm. The face recognition algorithm [160] uses a database [161] preferably stored on the camera comprising personal identifiers and their associated face parameters.

In operation, the module [160] collects identifiers over a series of frames. When the identifiers of a detected face tracked over a number of preview frames are predominantly of one particular person, that person is deemed by the recognition module to be present in the image. One or both of the identifier of the person and the last known location of the face are stored either in the image (in a header) or in a separate file stored on the camera storage [150]. This storing of the person's ID can occur even when the recognition module [160] has failed for the immediately previous number of frames but for which a face region was still detected and tracked by the module [111].

When an image is copied from camera storage to a display or permanent storage device such as a PC (not shown), the person ID's are copied along with the images. Such devices are generally more capable of running a more robust face detection and recognition algorithm and then combining the results with the recognition results from the camera, giving more weight to recognition results from the robust face recognition (if any). The combined identification results are presented to the user, or if identification was not possible, the user is asked to enter the name of the person that was found. When the user rejects an identification or a new name is entered, the PC retrains its face print database and downloads the appropriate changes to the capture device for storage in the light-weight database [161]. When multiple confirmed face regions [145] are detected, the recognition module [160] can detect and recognize multiple persons in the image.

It is possible to introduce a mode in the camera that does not take a shot until persons are recognized or until it is clear that persons are not present in the face print database, or alternatively displays an appropriate indicator when the persons have been recognized. This allows reliable identification of persons in the image.

This feature solves the problem where algorithms using a single image for face detection and recognition may have lower probability of performing correctly. In one example, for recognition, if the face is not aligned within certain strict limits it is not possible to accurately recognize a person. This method uses a series of preview frames for this purpose as it can be expected that a reliable face recognition can be done when many more variations of slightly different samples are available.

Further improvements to the efficiency of systems described herein are possible. For example, a face detection algorithm may employ methods or use classifiers to detect faces in a picture at different orientations: 0, 90, 180 and 270 degrees. According to a further embodiment, the camera is equipped with an orientation sensor. This can comprise a hardware sensor for determining whether the camera is being held upright, inverted or tilted clockwise or anti-clockwise. Alternatively, the orientation sensor can comprise an image analysis module connected either to the image acquisition hardware 105, 110 or camera memory 140 or image store 150, each as illustrated in FIG. 1, for quickly determining whether images are being acquired in portrait or landscape mode and whether the camera is tilted clockwise or anti-clockwise.

Once this determination is made, the camera orientation can be fed to one or both of the face detectors 120, 121. The detectors need then only apply face detection according to the likely orientation of faces in an image acquired with the determined camera orientation. This feature significantly reduces face detection processing overhead, for example, by avoiding the employing of classifiers which are unlikely to detect faces or increase its accuracy by running classifiers more likely to detects faces in a given orientation more often.

According to another embodiment, there is provided a method for image recognition in a collection of digital images that includes training image classifiers and retrieving a sub-set of images from the collection. The training of the image classifiers preferably includes one, more than one or all of the following: For each image in the collection, any regions within the image that correspond to a face are identified. For each face region and any associated peripheral region, feature vectors are determined for each of the image classifiers. The feature vectors are stored in association with data relating to the associated face region.

The retrieval of the sub-set of images from the collection preferably includes one, more than one or all of the following: At least one reference region including a face to be recognized is/are selected from an image. At least one classifier on which said retrieval is to be based is/are selected from the image classifiers. A respective feature vector for each selected classifier is determined for the reference region. The sub-set of images is retrieved from within the image collection in accordance with the distance between the feature vectors determined for the reference region and the feature vectors for face regions of the image collection.

A component for image recognition in a collection of digital images is further provided including a training module for training image classifiers and a retrieval module for retrieving a sub-set of images from the collection.

The training module is preferably configured according to one, more than one or all of the following: For each image in the collection, any regions are identified that correspond to a face in the image. For each face region and any associated peripheral region, feature vectors are determined for each of the image classifiers. The feature vectors are stored in association with data relating to the associated face region.

The retrieval module is preferably configured according to one, more than one or all of the following: At least one reference region including a face to be recognized is/are selected from an image. At least one image classifier is/are selected on which the retrieval is to be based. A respective feature vector is determined for each selected classifier of the reference region. A sub-set of images is selected from within the image collection in accordance with the distance between the feature vectors determined for the reference region and the feature vectors for face regions of the image collection.

In a further aspect there is provided a corresponding component for image recognition. In this embodiment, the training process cycles automatically through each image in an image collection, employing a face detector to determine the location of face regions within an image. It then extracts and normalizes these regions and associated non-face peripheral regions which are indicative of, for example, the hair, clothing and/or pose of the person associated with the determined face region(s). Initial training data is used to determine a basis vector set for each face classifier.

A basis vector set comprises a selected set of attributes and reference values for these attributes for a particular classifier. For example, for a DCT classifier, a basis vector could comprise a selected set of frequencies by which selected image regions are best characterized for future matching and/or discrimination and a reference value for each frequency. For other classifiers, the reference value can simply be the origin (zero value) within a vector space.

Next, for each determined, extracted and normalized face region, at least one feature vector is generated for at least one face-region based classifier and where an associated non-face region is available, at least one further feature vector is generated for a respective non-face region based classifier. A feature vector can be thought of as an identified region's coordinates within the basis vector space relative to the reference value.

These data are then associated with the relevant image and face/peripheral region and are stored for future reference. In this embodiment, image retrieval may either employ a user selected face region or may automatically determine and select face regions in a newly acquired image for comparing with other face regions within the selected image collection. Once at least one face region has been selected, the retrieval process determines (or if the image was previously "trained", loads) feature vectors associated with at least one face-based classifier and at least one non-face based classifier. A comparison between the selected face region and all other face regions in the current image collection will next yield a set of distance measures for each classifier. Further, while calculating this set of distance measures, mean and variance values associated with the statistical distribution of the distance measures for each classifier are calculated. Finally these distance measures are preferably normalized using the mean and variance data for each classifier and are summed to provide a combined distance measure which is used to generate a final ranked similarity list.

In another embodiment, the classifiers include a combination of wavelet domain PCA (principle component analysis) classifier and 2D-DCT (discrete cosine transform) classifier for recognizing face regions. These classifiers do not require a training stage for each new image that is added to an image collection. For example, techniques such as ICA (independent component analysis) or the Fisher Face technique which employs LDA (linear discriminant analysis) are well known face recognition techniques which adjust the basis vectors during a training stage to cluster similar images and optimize the separation of these clusters.

The combination of these classifiers is robust to different changes in face poses, illumination, face expression and image quality and focus (sharpness). PCA (principle component analysis) is also known as the eigenface method. A summary of conventional techniques that utilize this method is found in *Eigenfaces for Recognition*, Journal of Cognitive Neuroscience, 3(1), 1991 to Turk et al. This method is sensitive to facial expression, small degrees of rotation and different focus conditions and/or illuminations. In the preferred embodiment, high frequency components from the image that are responsible for slight changes in face appearance are filtered. Features obtained from low pass filtered sub-bands from the wavelet decomposition are significantly more robust to facial expression, small degrees of rotation and different illuminations than conventional PCA.

In general, the steps involved in implementing the PCA/Wavelet technique include: (i) the extracted, normalized face region is transformed into gray scale; (ii) wavelet decomposition in applied using Daubechie wavelets; (iii) histogram equalization is performed on the grayscale LL sub-band representation; next, (iv) the mean LL sub-band is calculated and subtracted from all faces and (v) the 1st level LL sub-band is used for calculating the covariance matrix and the principal components (eigenvectors). The resulting eigenvectors (basis vector set) and the mean face are stored in a file after training so they can be used in determining the principal components for the feature vectors for detected face regions. Alternative embodiments may be discerned from the discussion in H. Lai, P. C. Yuen, and G. C. Feng, "Face recognition using holistic Fourier invariant features" Pattern Recognition, vol. 34, pp. 95-109, 2001.

In the 2D Discrete Cosine Transform classifier, the spectrum for the DCT transform of the face region can be further processed to obtain more robustness (see also, *Application of the DCT Energy Histogram for Face Recognition*, in Proceedings of the 2nd International Conference on Information Technology for Application (ICITA 2004) to Tjahyadi et al.

The steps involved in this technique are generally as follows: (i) the resized face is transformed to an indexed image using a 256 color gif colormap; (ii) the 2D DCT transform is applied; (iii) the resulting spectrum is used for classification; (iv) for comparing similarity between DCT spectra the Euclidian distance was used. Examples of non-face based classifiers are based on color histogram, color moment, colour correlogram, banded colour correlogram, and wavelet texture analysis techniques. An implementaton of color histogram is described in "CBIR method based on color-spatial feature," *IEEE Region 10th Ann. Int. Conf* 1999 (*TENCON '99*, Cheju, Korea, 1999). Use of the colour histogram is, however, typically restricted to classification based on the color information contained within one or more sub-regions of the image.

Color moment may be used to avoid the quantization effects which are found when using the color histogram as a classifier (see also "Similarity of color images," *SPIE Proc.* pp. 2420 (1995) to Stricker et al.). The first three moments (mean, standard deviation and skews) are extracted from the three color channels and therefore form a 9-dimensional feature vector.

The color auto-correlogram (see, U.S. Pat. No. 6,246,790 to Huang et al.) provides an image analysis technique that is based on a three-dimensional table indexed by color and distance between pixels which expresses how the spatial correlation of color changes with distance in a stored image. The color correlogram may be used to distinguish an image from other images in a database. It is effective in combining the color and texture features together in a single classifier (see also, "Image indexing using color correlograms," In *IEEE Conf Computer Vision and Pattern Recognition*, PP. 762 et seq (1997) to Huang et al.).

In certain embodiments, the color correlogram is implemented by transforming the image from RGB color space, and reducing the image colour map using dithering techniques based on minimum variance quantization. Variations and alternative embodiments may be discerned from *Variance based color image quantization for frame buffer display,*" Color Res. Applicat., vol. 15, no. 1, pp. 52-58, 1990 to by Wan et al. Reduced colour maps of 16, 64, 256 colors are achievable. For 16 colors the VGA colormap may be used and for 64 and 256 colors, a gif colormap may be used. A maximum distance set D=1; 3; 5; 7 may be used for computing auto-correlogram to build a N×D dimension feature vector where N is the number of colors and D is the maximum distance.

The color autocorrelogram and banded correlogram may be calculated using a fast algorithm (see, e.g., "Image Indexing Using Color Correlograms" from the Proceedings of the 1997 Conference on Computer Vision and Pattern Recognition (CVPR '97) to Huang et al.). Wavelet texture analysis techniques (see, e.g., "Texture analysis and classification with tree-structured wavelet transform," *IEEE Trans. Image Processing* 2(4), 429 (1993) to Chang et al.) may also be advantageously used. In order to extract the wavelet based texture, the original image is decomposed into 10 de-correlated sub-bands through 3-level wavelet transform. In each sub-band, the standard deviation of the wavelet coefficients is extracted, resulting in a 10-dimensional feature vector.

Figure 4:
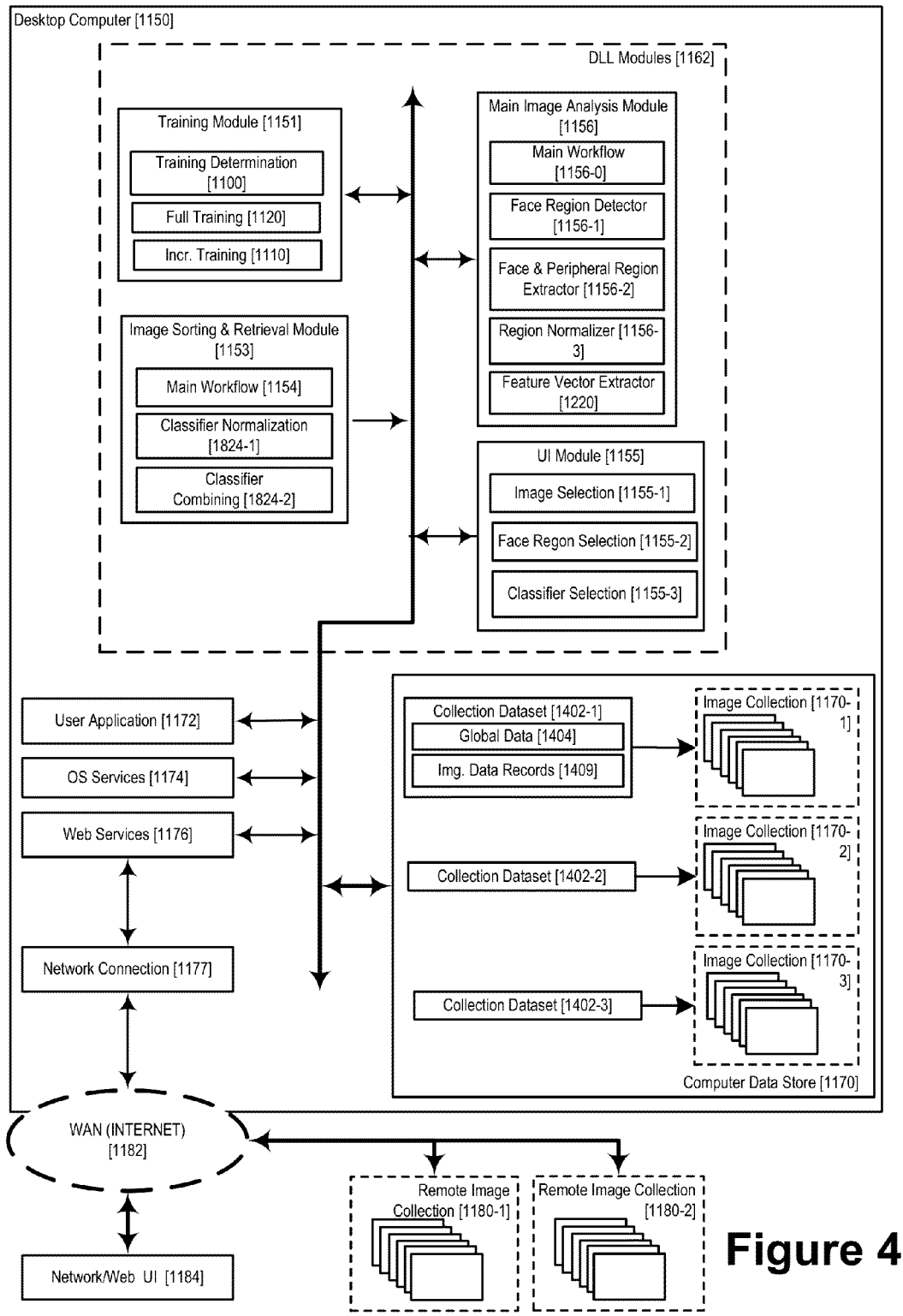
FIG. 4 is a block diagram of an image processing system in accordance with certain embodiments.
Figure 5:
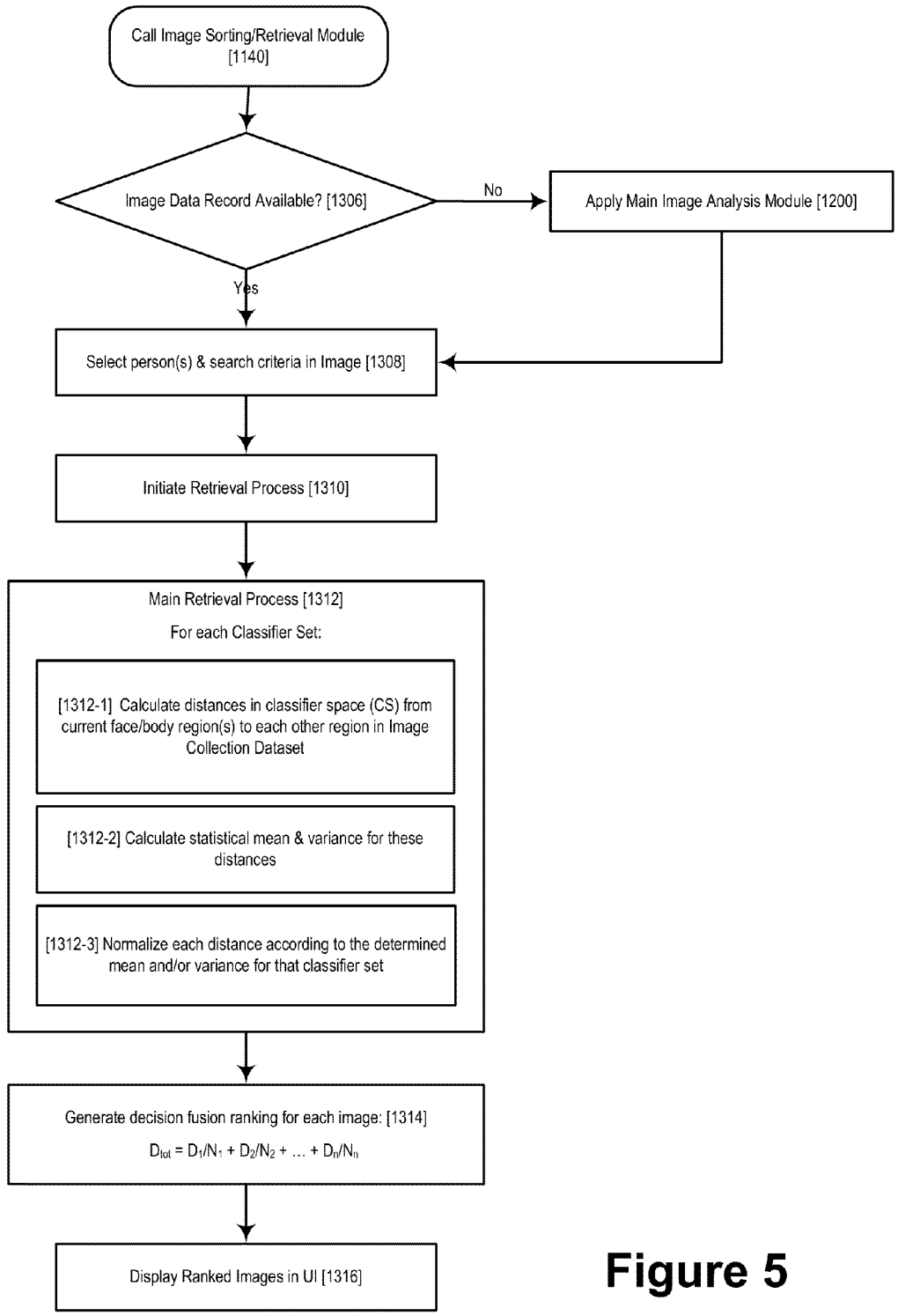
FIG. 5 illustrates a main image sorting/retrieval workflow in accordance with certain embodiments.
Figure 6A:
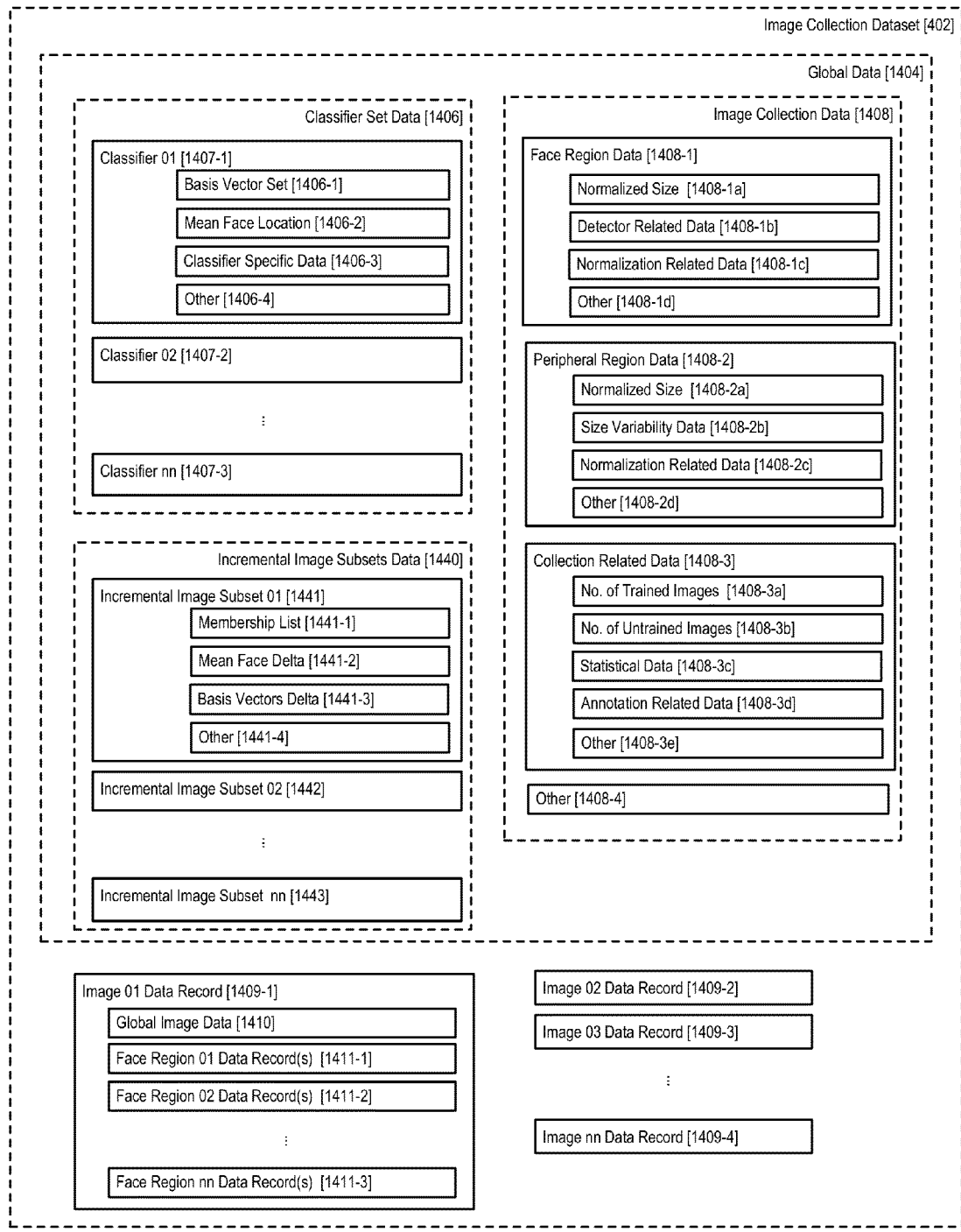
FIG. 6A illustrates an exemplary data storage structure for an image collection data set.
Figure 6B:
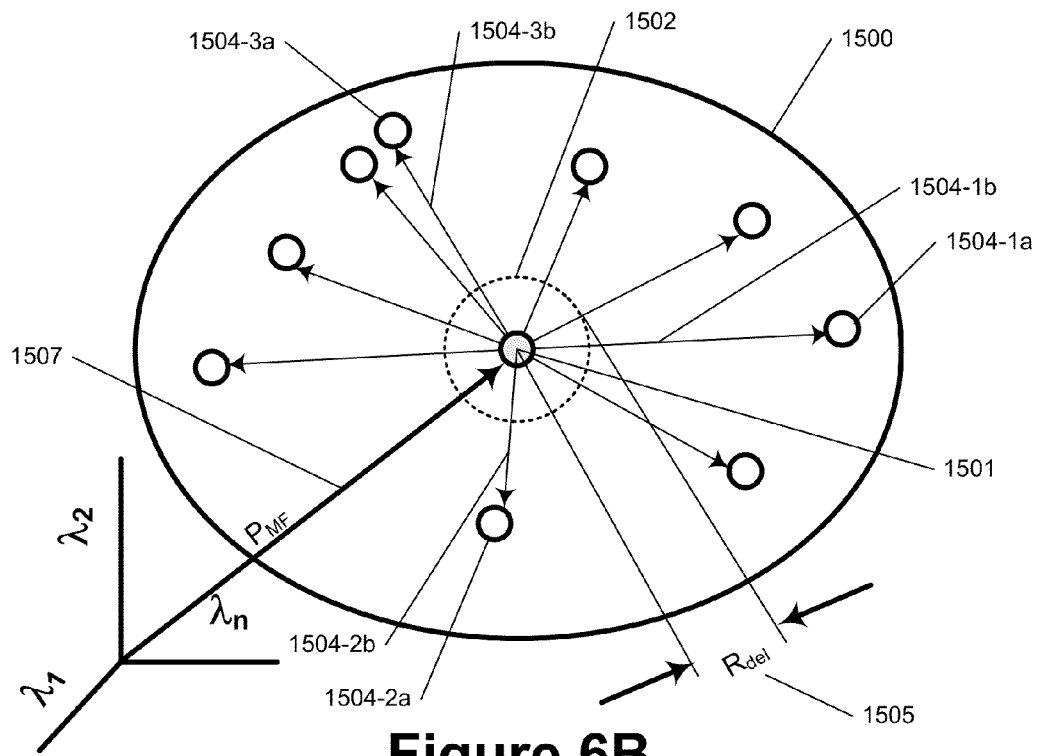
FIGS. 6B and 6D illustrate aspects of an image classifier where the feature vectors for individual patterns can be determined relative to an "averaged" pattern (mean face) and where feature vectors for individual patterns are determined in absolute terms (colour correlogram), respectively.
Figure 6C:
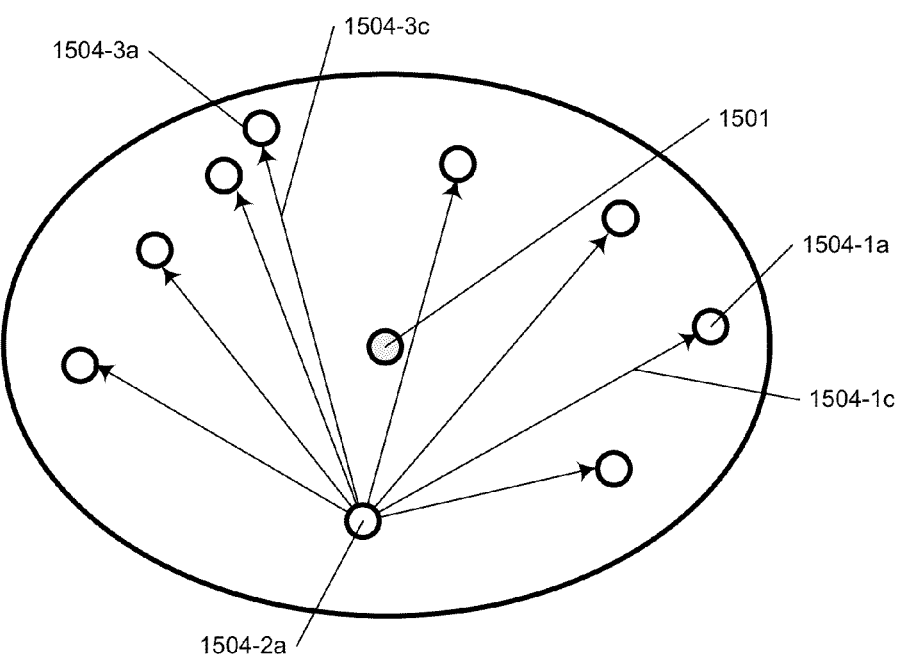
FIGS. 6C and 6E illustrate the calculation of respective sets of similarity measure distances from a selected classifier pattern to all other classifier patterns within images of the Image Collection.
Figure 6D:
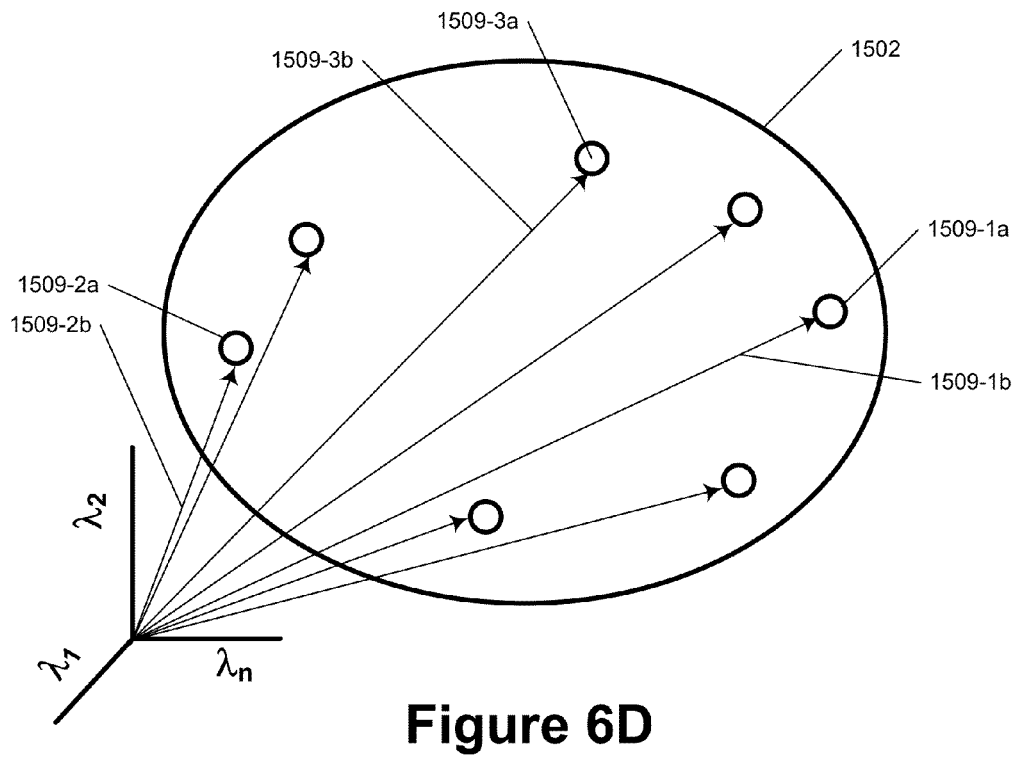
Figure 6E:
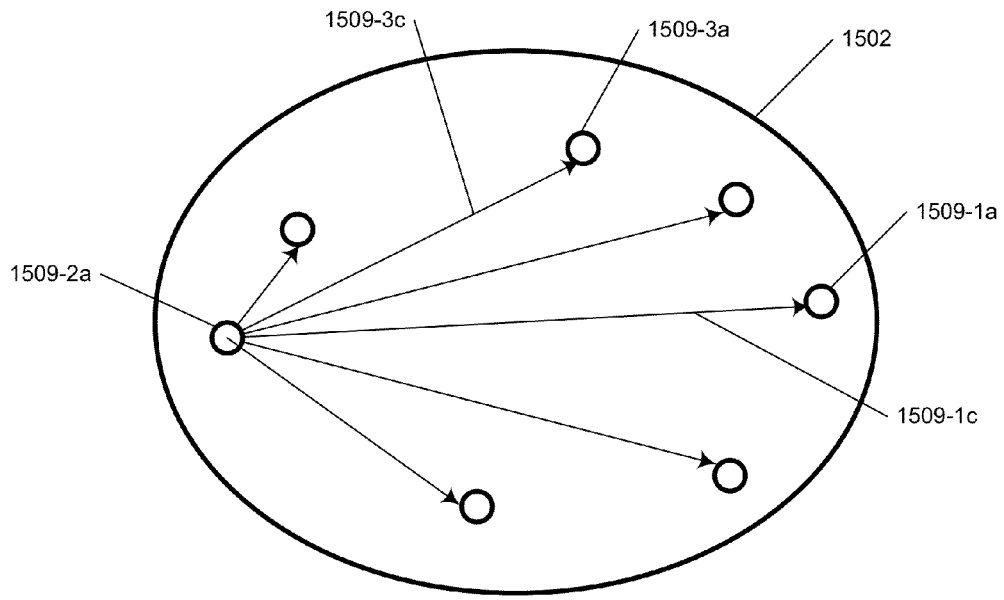
Figure 6F:
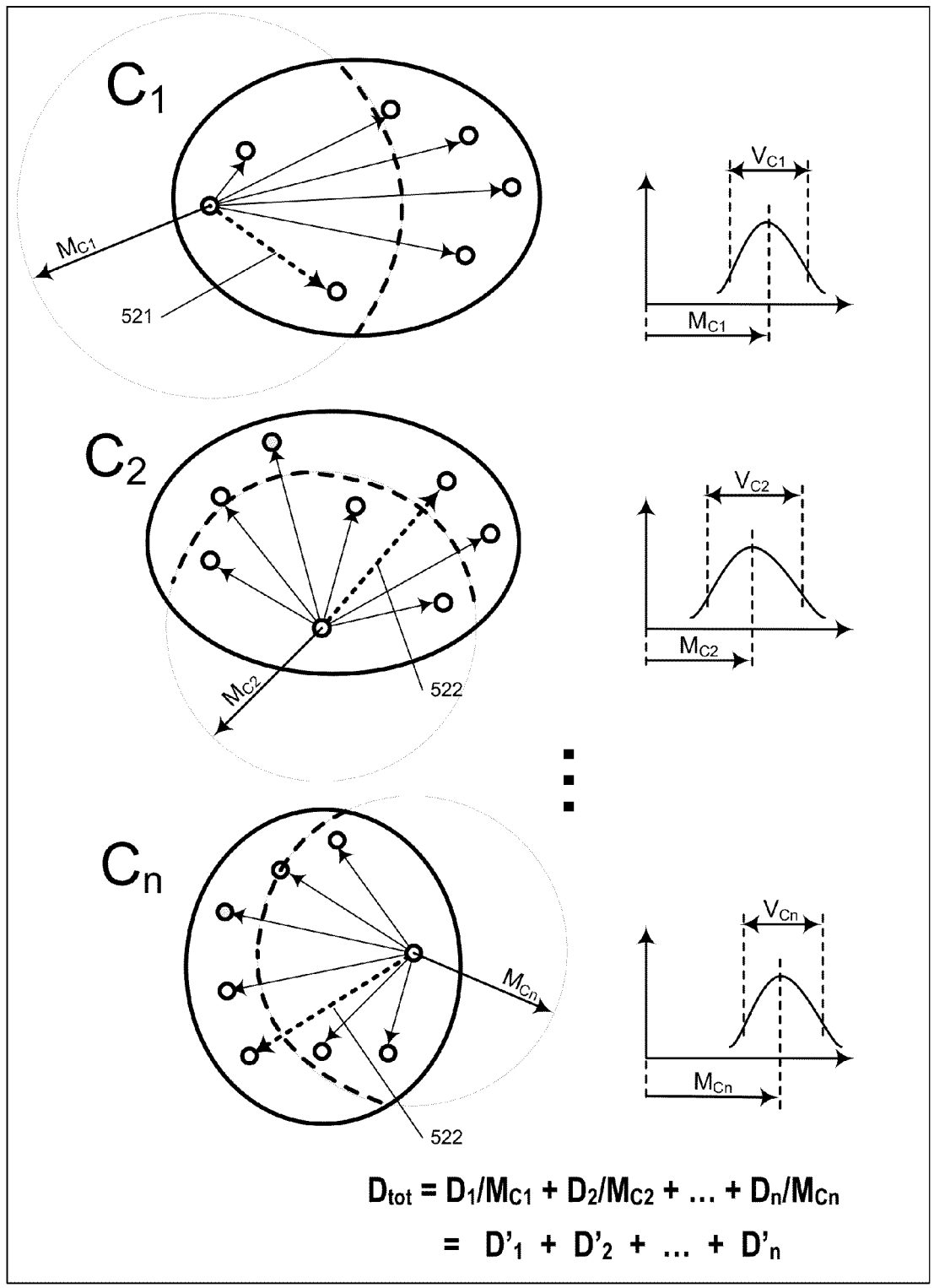
FIG. 6F illustrates how multiple classifiers can be normalized and their similarity measures combined to provide a single, similarity measure.

Another embodiment is described in relation to FIG. 4. This takes the form of a set of software modules 1162 implemented on a desktop computer 1150. A second preferred embodiment provides an implementation within an embedded imaging appliance such as a digital camera.

In this embodiment, a program may be employed in a desktop computer environment and may either be run as a stand-alone program, or alternatively, may be integrated in existing applications or operating system (OS) system components to improve their functionality.

Image Analysis Module

Figure 7:
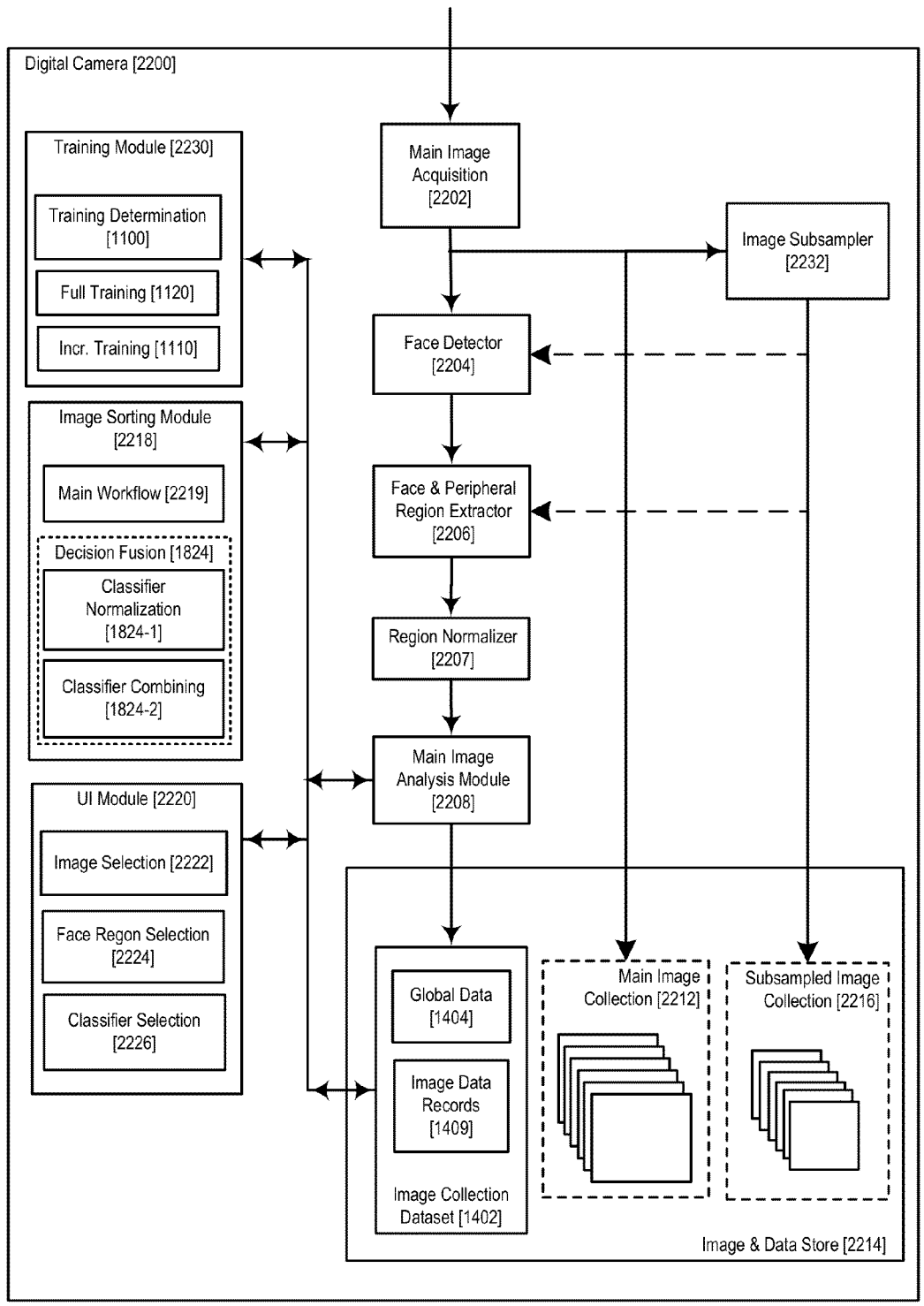
FIG. 7 is a block diagram of an in-camera image processing system according to certain embodiments.

An image analysis module 1156, such as that illustrated at FIG. 4, cycles through a set of images 1170-1 . . . 1180-2 and determines, extracts, normalizes and analyzes face regions and associated peripheral regions to determine feature vectors for a plurality of face and non-face classifiers. The module then records this extracted information in an image data set record. Components of this module are also used in both training and sorting/retrieval modes of the embodiment. The module is called from a higher level workflow and in its normal mode of usage is passed a set of images which, as illustrated at FIG. 7, are analyzed [2202]. The module loads/acquires the next image [2202] and detects any face regions in said image [2204]. If no face regions were found, then flags in the image data record for that image are updated to indicate that no face regions were found. If the current image is not the last image in the image set being analyzed [2208], upon image subsampling [2232], face and peripheral region extraction [2206] and region normalization [2207], the next image is loaded/acquired [2204]. If this was the last image, then the module will exit to a calling module. Where at least one face region is detected the module next extracts and normalizes each detected face region and, where possible, any associated peripheral regions.

Face region normalization techniques can range from a simple re-sizing of a face region to more sophisticated 2D rotational and affine transformation techniques and to highly sophisticated 3D face modeling methods.

Image Sorting/Retrieval Process

The workflow for an image sorting/retrieval process or module is illustrated at FIGS. 5 and 6A-6F and is initiated from an image selection or acquisition process (see US 2006/0140455) as the final process step [1140]. It is assumed that when the image sorting/retrieval module is activated [1140] it will also be provided with at least two input parameters providing access to (i) the image to be used for determining the search/sort/classification criteria, and (ii) the image collection data set against which the search is to be performed. If a data record is determined to not be available [1306] and has not already been determined for the search image which proceeds to select persons and search criteria in the image [1308], then main image analysis module is next applied to it to generate this data record [1200]. The image is next displayed to a user who may be provided options to make certain selections of face regions to be used for searching and/or also of the classifiers to be used in the search [1308]. Alternatively, the search criteria may be predetermined or otherwise automated through a configuration file and step [1308] may thus be automatic. User interface aspects are described in detail at US 2006/0140455, incorporated by reference.

After a reference region comprising the face and/or peripheral regions to be used in the retrieval process is selected (or determined automatically) the main retrieval process is initiated [1310] either by user interaction or automatically in the case where search criteria are determined automatically from a configuration file. The main retrieval process is described in step [1312] and comprises three main sub-processes which are iteratively performed for each classifier to be used in the sorting/retrieval process:

(i) Distances are calculated in the current classifier space between the feature vector for the reference region and corresponding feature vector(s) for the face/peripheral regions for all images in the image collection to be searched [1312-1]. In the preferred embodiment, the Euclidean distance is used to calculate these distances which serve as a measure of similarity between the reference region and face/peripheral regions in the image collection.

(ii) The statistical mean and standard deviation of the distribution of these calculated distances is determined and stored temporarily [1312-2].

(iii) The determined distances between the reference region and the face/peripheral regions in the image collection are next normalized [1312-3] using the mean and standard deviation determined in step [1312-2].

These normalized data sets may now be combined in a decision fusion process [1314] which generates a ranked output list of images. These may then be displayed by a UI module [1316].

An additional perspective on the process steps [1312-1, 1312-2 and 1312-3] is given in US 2006/0140455. The classifier space [1500] for a classifier may be such as the Wavelet/PCA face recognition described at US 2006/0140455. The basis vector set, $[\lambda_1, \lambda_2, \ldots, \lambda_n]$ may be used to determine feature vectors for this classifier. The average or mean face is calculated during the training phase and its vector position [1507] in classifier space [1500] is subtracted from the absolute position of all face regions. Thus, exemplary face regions [1504-1a, 1504-2a and 1504-3a] have their positions [1504-1b, 1504-2b and 1504-3b] in classifier space defined in vector terms relative to the mean face [1501].

After a particular face region [1504-2a] is selected by the user [1308] the distances to all other face regions within a particular image collection are calculated. The face regions [1504-1a] and [1504-3a] are shown as illustrative examples. The associated distances (or non-normalized rankings) are given as [1504-1c] and [1504-3c].

An analogous case arises when the distances in classifier space are measured in absolute terms from the origin, rather than being measured relative to the position of an averaged, or mean face. For example, the color correlogram technique as used in certain embodiments is a classifier of this type which does not have the equivalent of a mean face.

The distances from the feature vector for the reference region [1504-2a] and [1509-2a] to the feature vectors for all other face regions may be calculated in a number of ways. In one embodiment, Euclidean distance is used, but other distance metrics may be advantageously employed for certain classifiers other than those described here.

Methods for Combining Classifier Similarity Measures Statistical Normalization Method A technique is preferably used for normalizing and combining the multiple classifiers to reach a final similarity ranking. The process may involve a set of multiple classifiers, $C_1, C_2 \ldots C_N$ and may be based on a statistical determination of the distribution of the distances of all patterns relevant to the current classifier (face or peripheral regions in our embodiment) from the selected reference region. For most classifiers, this statistical analysis typically yields a normal distribution with a mean value $M_{C_n}$ and a variance $V_{C_n}$.

In-Camera Implementation

As imaging appliances continue to increase in computing power, memory and non-volatile storage, it will be evident to those skilled in the art of digital camera design that many advantages can be provided as an in-camera image sorting sub-system. An exemplary embodiment is illustrated in FIG. 7.

Following the main image acquisition process [2202] a copy of the acquired image is saved to the main image collection [2212] which will typically be stored on a removable compact-flash or multimedia data card [2214]. The acquired image may also be passed to an image subsampler [2232] which generates an optimized subsampled copy of the main image and stores it in a subsampled image collection [2216]. These subsampled images may advantageously be employed in the analysis of the acquired image.

The acquired image (or a subsampled copy thereof) is also passed to a face detector module followed by a face and peripheral region extraction module [2206] and a region normalization module [2207]. The extracted, normalized regions are next passed to the main image analysis module [2208] which generates an image data record [1409] for the current image. The main image analysis module may also be called from the training module [2230] and the image sorting/retrieval module [2218].

A UI module [2220] facilitates the browsing & selection of images [2222], the selection of one or more face regions [2224] to use in the sorting/retrieval process [2218]. In addition classifiers may be selected and combined [2226] from the UI Module [2220].

Various combinations are possible where certain modules are implemented in a digital camera and others are implemented on a desktop computer.

Focus Condition Classifiers

A branched classifier chain may be used for simultaneous classification of faces and classification of an out of focus (or focused) condition. In certain embodiments, a classifier chain is constructed that, after an initial set of feature detectors that reject the large majority of objects within an image as non-faces, applies a set of, for example 3, 4, 5, 6, 7, 8 or 9, feature detectors. The feature detectors may tuned so that they accept faces that are sharply focused, slightly out of focus or significantly out of focus. Greater numbers of classifier cascades than three may be used, such as sharply focused, slightly out of focus, a little more out of focus, a little more out of focus, . . . , significantly out of focus, and two may be used, e.g., focused and out of focus. Other combinations are possible, and some may be excluded, e.g., after application of one classifier provides a determination that a face exists within the image or a sub-window of the image of a certain focus condition. When one of the classifier branches accepts the face, it can be said that the face and the focus condition of the face are detected. This detection can be used to process the image with greater attention to faces than non-faces, and/or to correct the out of focus condition, improving face detection and/or face recognition results.

Alternatively, the detected focus condition problems in one detection frame may be corrected in the next frame so the face detection algorithm has a better chance of finding the face. The focus condition detection comes essentially for free as the length of the classifier chain is not longer than in the previous design.

Figure 8:
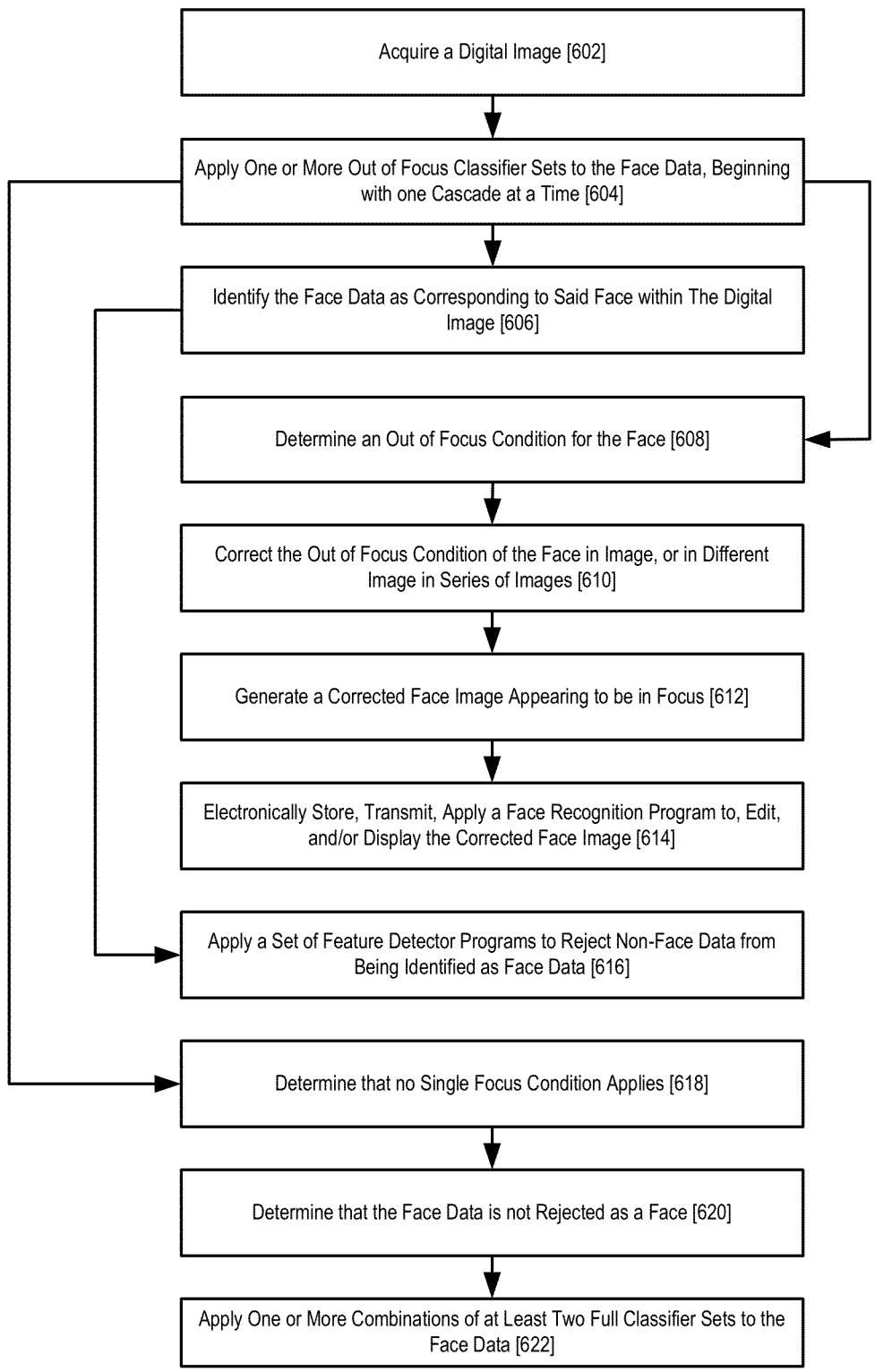
FIG. 8 illustrates a face-based auto focus method in accordance with certain embodiments.

FIG. 8 illustrates a face focus normalization method in accordance with certain embodiments. A digital image is acquired at 602. One or more out of focus classifier sets are applied to the data at 604, beginning with one cascade at a time. The sets may be used to find faces and/or to determine an out of focus (or focused) condition within an already detected face image. Depending on the data retrieved in 604, a method according to different embodiments would next identify a face within the image at 606, or determine an out of focus (or focused) condition for a face at 608, or both 606 and 608 contemporaneously or one after the other in either order. For example, a face may be found and then a focus condition found for the face, or a focus condition for an object may be found followed by a determination whether the object is a face.

It may also be determined that no single focus condition exists at 618. If a face is determined to exist at 606 or the data is not (yet) rejected as not including a face at 606, then at 616, a set of feature detector programs may be applied to reject non-face data from being identified as a face (or accept face data as being identified as a face).

If an out of focus condition is determined at 608, then at 610 the out of focus condition may be corrected for the image and/or for another image in a series of images. For example, the original image may be a preview image, and a full resolution image may be corrected either during acquisition (e.g., by adjusting a flash condition or by providing suggestions to the camera-user to move before taking the picture, etc.) or after acquisition either in-camera before or after storing a permanent image, or on an external device later-on. Corrected face image data may be generated at 612 appearing to be in focus or more sharply focused, and the corrected face image may be stored, transmitted, captured, combined with other face data, applied to a face recognition program, edited and/or displayed at 614.

If it is determined at 618 that no single focus condition applies, then the face data may be rejected or not rejected as a face at 620. If the face data is not rejected as a face at 620, then at 622, combinations of two or more classifier sets may be applied to the data.

FIGS. 9A-9B illustrate face detection methods in accordance with certain further embodiments. A digital image is acquired at 702. A sub-window is extracted from the image at 704. Two or more shortened face detected classifier cascades are applied to the sub-window at 706. These cascades are trained to be selectively sensitive to a characteristic of a face region.

At 708, a probability is determined that a face with a certain form of the characteristic is present within the sub-window. The characteristic may include a focus condition, or an illumination condition, or a pose or direction of the face relative to the camera, or another characteristic such as resolution, size, location, motion, blurriness, facial expression, blink condition, red, gold or white eye condition, occlusion condition or an appearance, e.g., of a face within a collection having multiple appearances such as shaven or unshaven, a hair style, or wearing certain jewelry, among other features. An extended face detection classifier cascade is applied at 710 for sensitivity to the form of the characteristic. A final determination is provided at 712 whether a face exists within the sub-window. If so, then optionally at 714, an out of focus condition or an uneven illumination condition, etc., for the face image may be corrected within the image and/or within a different image in a series of images. In addition, the process may return to 704 to extract a further sub-window, if any, from the image.

At 742, a digital image may be acquired, and a sub-window extracted therefrom at 744. Two or more shortened face detection classifier cascades may be applied at 746 that are trained to be selectively sensitive to out of focus conditions. A probability is determined that a face having a certain out of focus condition is present within the sub-window at 748. An extended face detection classifier cascade is applied at 750 that is trained for sensitivity to the certain form of out of focus condition, e.g., slightly out of focus, or significantly out of focus, and a separate classifier cascade may be trained for sharply focused conditions. A final determination is provided at 752 whether a face exists within the image sub-window. A further sub-window, if any, may then be extracted by returning the process to 744 and/or an out of focus condition of the face may be corrected within the image and/or a different image in a series of images at 754.

The "Chain Branching" idea for Luminance is fairly straight-forward to implement and to test since it requires no alterations to the training algorithm. The variations/"mutations" of a face are considered as distinct objects and each one receives a distinct detector/cascade of classifiers. The detectors are all the same, linear chains of full extent.

In detection the straightforward approach would be to exhaustively run all the detectors and see which ones accept the window and then choose the best score. This means that the correct detector is selected at the end. However, this is not what we tested, being very time-consuming.

$$Chain1 = cls11 + cls12 + \ldots + cls1M$$
$$\ldots$$
$$ChainN = clsN1 + clsN2 + \ldots + clsNM$$

The detectors may be run in series or in parallel or some combination thereof, and an at least partial confidence may be accumulated, viz:

$$Partial1 = cls11 + cls12 + \ldots + cls1P$$
$$\ldots$$
$$PartialN = clsN1 + clsN2 + \ldots + clsNP, \text{ with } P < M$$

The best detector is chosen at this point with maximum Partial confidence value. Only that detector continues execution with:

$$ChainMax = PartialMax + clsMax(P+1) + clsMax(P+2) + \ldots + clsMaxM$$

So an exemplary workflow is:

Partial1 ...

... \

PartialMax ... (choose Max) –> continue with the rest of Max

... /

PartialN...

This approach may be applied for focus condition, face pose variation and/or an illumination condition or other characteristic. In the illumination case, one may use any combination of (i) frontally illuminated faces; (ii) faces illuminated from the top; (iii) faces illuminated from bottom; (iv) faces illuminated form the left and (v) faces illuminated from right. In the focus condition case, one may use for example (i) sharply focused faces, (ii) slightly out of focus faces, and (iii) significantly out of focus faces. The system may be trained to detect depths of various objects in the scene, and so may also be able to detect whether the out of focus condition is due to a focus plane being in front of or in back of the face or other object of interest. For example, if a background object is in focus, then the face or other object of interest is in front of the focal plane, whereas if an object known to be in front of the face or other object of interest is in focus, then the focal plane is in front of the face or other object of interest. In this case, there may be front and back slightly out of focus classifiers and/or front and back significantly out of focus classifiers. In the illumination case, because of the symmetric nature of faces, one could use just one of (iv) and (v) as there is symmetry between the classifiers obtained. The training images used for determining these classifier sets may be generated using an AAM model with one parameter trained to correspond to the level of top/bottom illumination and a second parameter trained to correspond to left/right illumination.

Figure 10A:
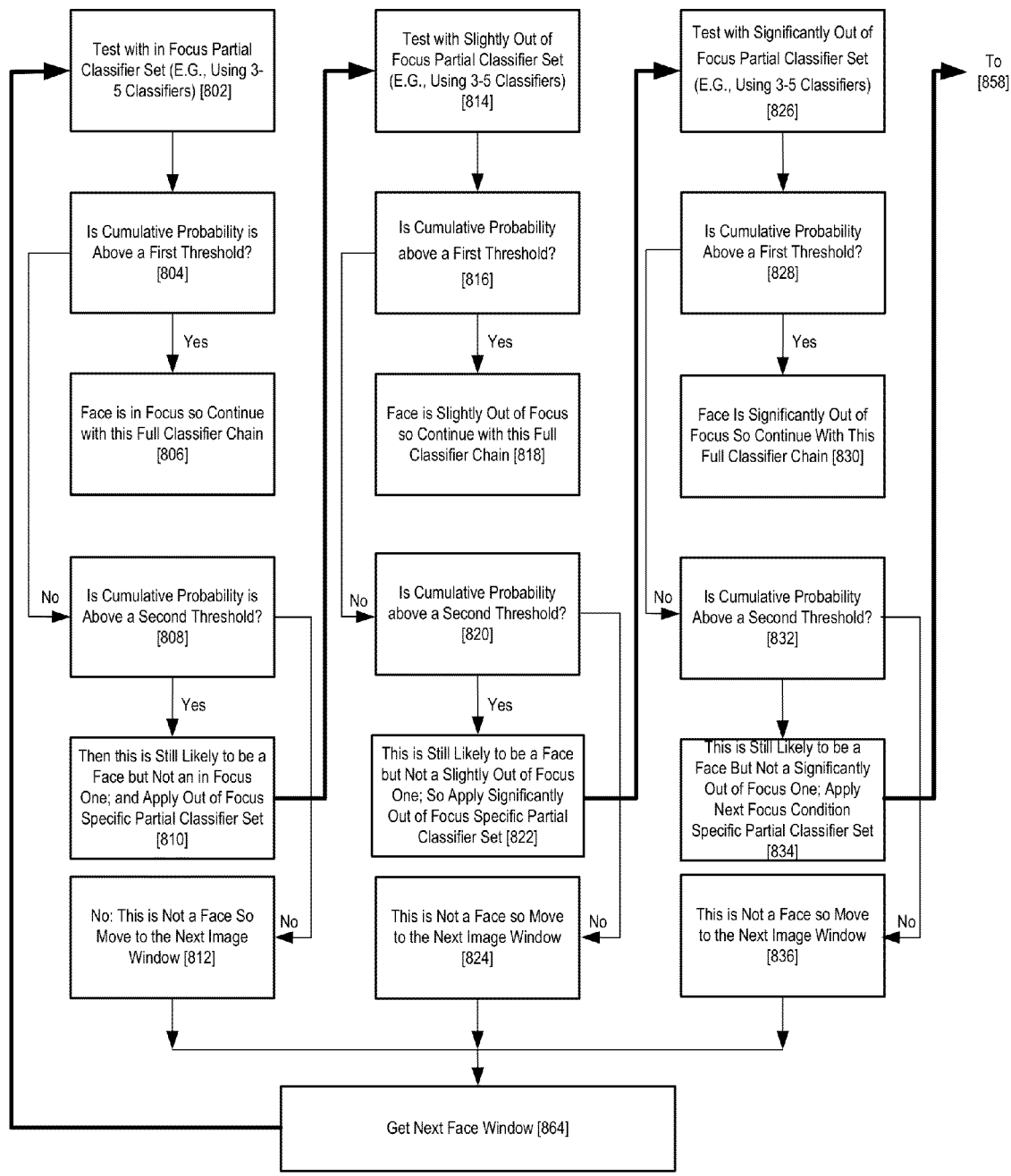
FIGS. 10A-10B illustrate a further method in accordance with certain embodiments.
Figure 10B:
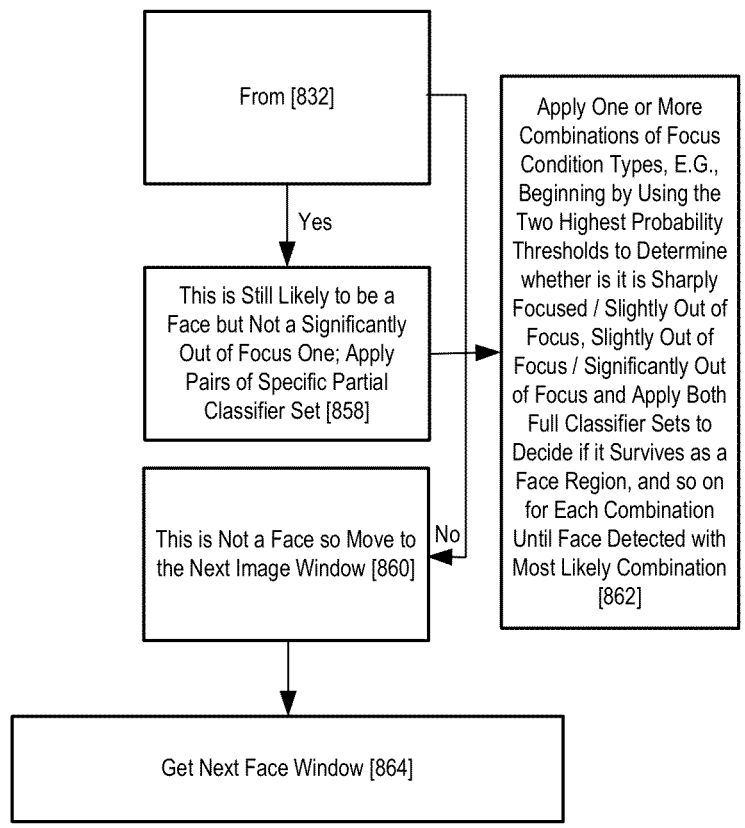

FIGS. 10A-10B illustrate an exemplary detailed workflow. At 802, a sub-window is tested with an in focus classifier set (e.g., using 3-5 classifiers). If a cumulative probability is determined at 804 to be above a first threshold, then the face is determined to be in focus at 806, and the process is continued with this full classifier chain. If the cumulative probability is determined to be below a second threshold (which is even lower than the first threshold), then at 812 the sub-window is determined to not contain a face, and the process is returned via 864 to 802. If the cumulative probability is determined at 808 to be above a second threshold, yet below the first threshold of 804, then the sub-window is deemed to still likely be a face at 810, but not an in focus one. Thus, a next out of focus specific partial classifier set is applied at 814.

The classifier can be applied in any order, although at step 814, the sub-window is tested with a slightly out of focus classifier set (e.g., using 3-5 classifiers). If the cumulative probability is determined to be above a first threshold at 816, then face is determined to be slightly out of focus at 818, and the process is continued with this full classifier chain. If the cumulative probability is deemed to be between the first threshold and a lower second threshold at 820, then at 822 the sub-window is determined to still likely contain a face, but not a slightly out of focus one, and so the process moves to 826 for applying a next out of focus specific partial classifier set. If the cumulative probability is deemed to be less than the second threshold, then at 824 the sub-window is determined to not contain a face, and the process moves back through 864 to the next sub-window and 802.

At 826, a test of the sub-window is performed with a illuminated significantly out of focus partial classifier set (e.g., using 3-5 classifiers). If the cumulative probability is determined at 828 to be above a first threshold, then the face is determined to be significantly out of focus and at 830 the process is continued with this full classifier chain. If cumulative probability is below the first threshold, but above a lower second threshold at 832, then the sub-window is determined to still likely contain a face at 834, although not a significantly out of focus one, and so the process moves to 838 and FIG. 10B to apply a next out of focus specific partial classifier set, if any. If at 832, the cumulative probability is deemed above a second threshold lower than the first indicated at 828, then the sub-window is still deemed to be likely to contain a face at 858, although neither a sharply focused one, nor a slightly out of focus one, nor a significantly out of focus one, and so now pairs of specific partial classifier sets are applied at 862. This is because at this point, the window has not passed any of the focus condition specific classifiers at their first threshold but neither has it been rejected as a face. Thus, a likely scenario is that the sub-window contains a face that is represented by a combination of focus condition types. So, the two highest probability thresholds may be first applied to determine whether it is in between sharply focused and slightly out of focus, or between slightly and significantly out of focus or perhaps more greatly focused than significantly out of focus or perhaps better focused than sharply focused, then multiple full classifier sets are applied to determined if it survives as a face region. If at 832 the cumulative probability was deemed to be below the second threshold, then at 860, the sub-window is deemed not to contain a face and the processes moves through 864 to 802 to the next image sub-window.

In an alternative embodiment split classifier chains can be used to perform rapid focusing onto individual face regions within an image.

In such an embodiment the classifier chain is split into a first component which serves as a generic face detector, using the higher-order, or simpler classifiers. These classifiers cannot match to finer features within the face region and as such they provide a good match to both focused and unfocused faces. In one preferred embodiment these classifiers are Haar classifiers.

Once a face region is confirmed—this may be either by application of this first component of a face detector, or by accepting data from a face tracking module or by combining information from both detector and tracker—then a set of additional classifier components are selectively applied to the confirmed face region.

In a preferred embodiment at least three distinct additional classifier components are provided and employed with a specialized MEMS lens system which enables rapid focusing of the image acquisition subsystem. All of these additional classifier components comprise of a chain of more complex classifiers.

In one preferred embodiment these classifiers are census classifiers. In alternative embodiments these may be combined with other complex classifiers.

The first additional classifier chain is selectively trained to match with sharply focused face regions to be neutral to face regions which are slightly out of focus and to actively reject faces which are significantly out of focus.

A second additional classifier chain is selectively trained to optimally match with face regions which are slightly out of focus, being neutral to faces which are sharply in focus and to reject face regions which are significantly out of focus.

A third additional classifier chain is selectively trained to optimally match to faces which are significantly out of focus and to actively reject sharply focused faces, being neutral to slightly unfocused faces.

In a preferred embodiment each of these components provides a score between 1 and 0 for the confirmed face region, said score being normalized against a large dataset to provide a substantially accurate indication of how well the confirmed face region matches to each of the criteria.

The operation of the invention is then as follows: (i) a confirmed face region has each of the applied additional components applied in turn to determine the degree of focus of the face; (ii) the MEMS lens is quickly adjusted and a second application of the three components is made; if the face was substantially unfocused and remains substantially unfocused then the movement of the lens was in the wrong direction and the lens is moved in the opposite direction, or the increment of the movement may be reduced; (iii) once a better match is achieved by the slightly unfocused component the increment of lens movement is further reduced and adjustments made until the score of the sharply focused component is greater than that of the slightly unfocused component then the face region is determined to be in-focus.

Because the MEMS lens assembly can rapidly change its focus it is possible to repeat this sequence on multiple faces within a single scene and to determine the optimal focus for each face region. In certain embodiments more than one image of the same scene may be captured and merged/blended into a single composite image to provide multiple, optimally focused faces. In alternative embodiments a global focus may be determined from the focus settings of all face regions within the image.

In other embodiments specific classifier chains may be employed for facial features. For example one set of classifiers may be trained to enable optimal focus on a person's eyes; a second set may be trained to enable optimal focus on their chin or mouth region; a third set may be trained for their hairline/forehead region; a fourth set may be trained for their ears and sides of the face. In combination such classifiers enable more accurate focus on a single face for portrait photography, thus enabling individual regions of the face to be kept in sharp focus, or slightly or substantially out of focus depending on the requirements of the portrait photographer.

The outline focus process described above may employ more complex and sophisticated algorithms. In addition more than the three level of focus described above may be employed although the three levels outlined above should be sufficient for most embodiments of this invention.

In certain embodiments it would also be possible to eliminate the sharply focused component and by rapidly moving the focal point of the lens between slightly unfocused positions in-front of and behind the face to determine the optimal focal distance.

Referring now to FIGS. 11A-11E, a system in accordance certain embodiments includes an embedded component in an environment where face (or other object) detection (and/or tracking) information is provided. Face detection particularly by training face classifiers have been widely researched and developed by the assignee of the present application, e.g., as described at U.S. Pat. Nos. 7,362,368, 7,616,233, 7,315,630, 7,269,292, 7,471,846, 7,574,016, 7,440,593, 7,317,815, 7,551,755, 7,558,408, 7,587,068, 7,555,148, 7,564,994, 7,565,030, 7,715,597, 7,606,417, 7,692,696, 7,680,342, 7,792,335, 7,551,754, 7,315,631, 7,469,071, 7,403,643, 7,460,695, 7,630,527, 7,469,055, 7,460,694, 7,515,740, 7,466,866, 7,693,311, 7,702,136, 7,620,218, 7,634,109, 7,684,630, 7,796,816 and 7,796,822, and U.S. published patent applications nos.

US 2006-0204034, US 2007-0201725, US 2007-0110305, US 2009-0273685, US 2008-0175481, US 2007-0160307, US 2008-0292193, US 2007-0269108, US 2008-0013798, US 2008-0013799, US 2009-0080713, US 2009-0196466, US 2008-0143854, US 2008-0220750, US 2008-0219517, US 2008-0205712, US 2009-0185753, US 2008-0266419, US 2009-0263022, US 2009-0244296, US 2009-0003708, US 2008-0316328, US 2008-0267461, US 2010-0054549, US 2010-0054533, US 2009-0179998, US 2009-0052750, US 2009-0052749, US 2009-0087042, US 2009-0040342, US 2009-0002514, US 2009-0003661, US 2009-0208056, US 2009-0190803, US 2009-0245693, US 2009-0303342, US 2009-0238419, US 2009-0238410, US 2010-0014721,

US 2010-0066822, US 2010-0039525, US 2010-0165150, US 2010-0060727, US 2010-0141787, US 2010-0141786, US 2010-0220899, US 2010-0092039, US 2010-0188530, US 2010-0188525, US 2010-0182458, US 2010-0165140 and US 2010-0202707, which are all incorporated by reference.

The system in certain embodiments contains MEMS (or similar) technology which allows changing the point of focus at a very fast speed. The MEMs technology may be as set forth at any of U.S. Pat. Nos. 7,769,281, 7,747,155, 7,729,603, 7,729,601, 7,702,226, 7,697,834, 7,697,831, 7,697,829, 7,693,408, 7,663,817, 7,663,289, 7,660,056, 7,646,969, 7,640,803, 7,583,006, 7,565,070, 7,560,679, 7,555,210, 7,545,591, 7,515,362, 7,495,852, 7,477,842, 7,477,400, 7,403,344, 7,359,131, 7,359,130, 7,345,827, 7,266,272, 7,113,688 and/or 6,934,087, which are hereby incorporated by reference.

The system has the capability to capture and/or store a limited sequence of images captured in a short amount of time. The method combines mature solutions, such as face detection and tracking, and MEMS technologies, as described for example in the reference cited above and as may otherwise be understood by those skilled in the art. Image registration and enhancement may be provided in various embodiments to order to obtain a well focused system. The method may be used for face and non-face objects, such as pets, cars, houses, personal property, natural scenery, avatars and other gaming objects, and many other identifiable objects, as long as automatic object detection and/or tracking is present in the system. A system in accordance with certain embodiments is capable of providing photos and digital images taken with any f-number where, together with a user-selected or automatically selected objects of interest such as faces, regardless of their distance to the camera, are kept in focus. The method involves MEMS capability to move the focus point quickly, rapidly, immediately or almost instantaneously, after an image has been captured. Object detection and tracking capability determines the position and the size of the objects in real time, while preview information is created. Image registration capability is provided in order to align the sequence of images to enable combining them on the spot, or later on after the images have been captured. Image blending and/or morphing capability may also be included, e.g., such that sharp faces from one image can be transposed in another image with a different point of focus.

The solution proposed solves the problem not only for deep focus but also for lenses with shallow focus for photos with groups of people.

With regard to selective focus, the viewer may be allowed to manually toggle between different focal points. A digital image may be acquired as usual, while a focal point is selected on an embedded device or computer afterward. With regard to multi-face focus, a single image may be created such that two or more or all of the faces (or other objects of interest) are sharply focused. The multi-face focus image may have a higher frequency than each of the individual images from the sequence, thereby providing best possible input data for security applications such as face recognition. These multi-face embodiments provide advanced, qualitative solutions which are suitable to real-time embedded implementation.

Referring to FIGS. 11A-11E, in certain embodiments, the system will capture a sequence of images, starting with an initial one, and following with a number of images equal with the number of objects (faces) of interest from the field of view. Initial reference, preview or postview image capturing may include an initial image being captured with default settings of a camera-enabled device. A focus on a main element (e.g. background, a certain object, a certain face) may be performed.

An object-of-interest image sequence capturing may be performed. For the following images the focus point is determined from the characteristics of the list of faces (or objects) detected. An example is illustrated. Multiple images captured at different focus positions may be saved altogether, providing the user or programmed device the possibility to choose or merge between them at a later stage, or further processed in the device, to provide a single, multi-focused image.

In an advanced use case, image alignment may involve optical, digital and/or mechanical stabilization to enable combining them together. Features described at any of U.S. Pat. Nos. 7,660,478, 7,639,889, 7,636,486, 7,639,888, 7,697,778, and/or U.S. Pat. Nos. 7,773,118, and 7,676,108 and/or U.S. patent application Ser. Nos. 12/330,719, 11/856,721, 12/485,316, 12/901,577, 12/820,002, 12/820,034, 12/820,086, 12/336,416, U.S. Ser. No. 11/753,098, and/or U.S. Ser. No. 12/137,113, which are hereby incorporated by reference, may be used in alternative embodiments.

Image blending and morphing is also possible such as illustrated at FIG. 11E for multi-focus capability. A number of images are blended together in such a way that areas of interest in focus take priority over the areas out of focus. In cases where object/faces of interest have moved from one image to another, morphing may be used in order to make the combination realistic and artifact free. While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

What is claimed is:

1. An object-based auto-focus method, comprising:
(a) acquiring a digital image including data corresponding to one or more faces or other specific objects of interest, or both (hereinafter an "object" and an "object data") that appears to be out of focus;
(b) applying one or more focus condition classifier programs to the object data, each of the one or more focus condition classifier programs being tuned to a different non-zero degree of out of focus blur, wherein said out of focus classifier programs each comprises one or more slightly out of focus classifiers or one or more significantly out of focus classifiers;
(c) identifying the object data as corresponding to said object within the digital image;
(d) determining an out of focus condition for the object also as a result of the applying of the one or more focus condition classifier programs, wherein said out of focus condition corresponds to a particular degree of out of focus blur at which one of the programs is tuned;

(e) correcting the out of focus condition of the object based on the determining, to thereby generate a corrected object image appearing to be sharply focused; and (f) electronically capturing, combining with another image, storing, transmitting, applying an object recognition program to, editing, or displaying the corrected object image, or combinations thereof.

2. The method of claim 1, further comprising applying an object recognition program to the corrected object image.

3. The method of claim 1, wherein the identifying the object data and the determining of the out of focus condition of the object are performed simultaneously.

4. The method of claim 1, further comprising applying a set of feature detector programs to reject non-object data from being identified as the object data.

5. The method of claim 1, further comprising applying a sharply focused classifier program to the object data.

6. The method of claim 5, further comprising determining a focus condition based on acceptance of the object data by one of the classifier programs.

7. The method of claim 6, wherein the digital image is one of multiple images in a series that include said object, and wherein said correcting is applied to a different image in the series than said digital image within which the focus condition is determined.

8. The method of claim 1, further comprising applying a sharply focused classifier program to the object data.

9. The method of claim 1, wherein the applying comprises applying at least two full classifier sets after determining that no single focus condition applies and that the object data is not rejected as being a specific object.

10. The method of claim 1, wherein the object comprises a face.

11. An object detection method, comprising:

(a) acquiring a digital image;

(b) extracting a sub-window from said image;

(c) applying two or more shortened face detection classifier cascades, each trained to be selectively sensitive to a different focus condition of one or more faces or other specific objects of interest, or both (hereinafter "object"), wherein each different focus condition corresponds to a different degree of out of focus blur of the object;

(d) based on the applying, determining a probability that a specific object with a certain focus condition, corresponding to a certain degree of out of focus blur of the is present within the sub-window;

(e) based on the determining, applying an extended object detection classifier cascade trained for sensitivity to said certain focus condition, wherein the certain focus condition is determined by applying one or more out of focus classifier cascades which each comprises one or more slightly out of focus classifiers or one or more significantly out of focus classifiers;

(f) providing a final determination that the specific object exists within the image sub-window; and (g) repeating steps (b)-(e) one or more times for one or more further sub-windows from the image or one or more further focus conditions, or both.

12. The method of claim 11, further comprising applying a sharply focused classifier cascade.

13. The method of claim 12, further comprising determining a focus condition of the specific object within a sub-window based on acceptance by one of the classifier cascades.

14. The method of claim 13, wherein the digital image is one of multiple images in a series that include the specific object, and the method further comprises correcting an out of focus condition of the specific object within a different image in the series than said digital image within which the focus condition is determined.

15. The method of claim 11, wherein the object comprises a face.

16. One or more non-transitory processor-readable media having code embedded therein for programming one or more processors to perform an auto-focus method, wherein the method comprises:

(a) acquiring a digital image including data corresponding to one or more faces or other specific objects of interest, or both (hereinafter an "object" and an "object data") that appears to be out of focus;

(b) applying one or more focus condition classifier programs to the object data, each of the one or more focus condition classifier programs being tuned to a different non-zero degree of out of focus blur, wherein said out of focus classifier programs each comprises one or more slightly out of focus classifiers or one or more significantly out of focus classifiers;

(c) identifying the object data as corresponding to said object within the digital image;

(d) determining an out of focus condition for the object also as a result of the applying of the one or more focus condition classifier programs, wherein said out of focus condition corresponds to a particular degree of out of focus blur at which one of the programs is tuned;

(e) correcting the out of focus condition of the object based on the determining, to thereby generate a corrected object image appearing to be sharply focused; and (f) electronically capturing, combining with another image, storing, transmitting, applying an object recognition program to, editing, or displaying the corrected object image, or combinations thereof.

17. The one or more non-transitory processor-readable media of claim 16, wherein the method further comprises applying an object recognition program to the corrected object image.

18. The one or more non-transitory processor-readable media of claim 16, wherein the identifying the object data and the determining of the out of focus condition of the object are performed simultaneously.

19. The one or more non-transitory processor-readable media of claim 16, wherein the method further comprises applying a set of feature detector programs to reject non-object data from being identified as the object data.

20. The one or more non-transitory processor-readable media of claim 16, wherein the method further comprises applying a sharply focused classifier program to the object data.

21. The one or more non-transitory processor-readable media of claim 20, wherein the method further comprises determining a focus condition based on acceptance of the object data by one of the classifier programs.

22. The one or more non-transitory processor-readable media of claim 21, wherein the digital image is one of multiple images in a series that include said object, and wherein said correcting is applied to a different image in the series than said digital image within which the focus condition is determined.

23. The one or more non-transitory processor-readable media of claim 16, wherein the method further comprises applying a sharply focused classifier program to the object data.

24. The one or more non-transitory processor-readable media of claim 16, wherein the applying comprises applying at least two full classifier sets after determining that no single focus condition applies and that the object data is not rejected as being a specific object.

25. The one or more non-transitory processor-readable media of claim 16, wherein the object comprises a face.

26. One or more non-transitory processor-readable media having code embedded therein for programming one or more processors to perform an object detection method, wherein the method comprises:
 (a) acquiring a digital image;
 (b) extracting a sub-window from said image;
 (c) applying two or more shortened face detection classifier cascades, each trained to be selectively sensitive to a different focus condition of one or more faces or other specific objects of interest, or both (hereinafter "object"), wherein each different focus condition corresponds to a different degree of out of focus blur of the object;
 (d) based on the applying, determining a probability that a specific object with a certain focus condition, corresponding to a certain degree of out of focus blur of the is present within the sub-window;
 (e) based on the determining, applying an extended object detection classifier cascade trained for sensitivity to said certain focus condition, wherein the certain focus condition is determined by applying one or more out of focus classifier cascades which each comprises one or more slightly out of focus classifiers or one or more significantly out of focus classifiers;
 (f) providing a final determination that the specific object exists within the image sub-window; and
 (g) repeating steps (b)-(e) one or more times for one or more further sub-windows from the image or one or more further focus conditions, or both.

27. The one or more non-transitory processor-readable media of claim 26, wherein the method further comprises applying a sharply focused classifier cascade.

28. The one or more non-transitory processor-readable media of claim 27, wherein the method further comprises determining a focus condition of the specific object within a sub-window based on acceptance by one of the classifier cascades.

29. The one or more non-transitory processor-readable media of claim 28, wherein the digital image is one of multiple images in a series that include the specific object, and the method further comprises correcting an out of focus condition of the specific object within a different image in the series than said digital image within which the focus condition is determined.

30. The one or more non-transitory processor-readable media of claim 26, wherein the object comprises a face.

31. A digital image acquisition device, comprising:
 a lens and image sensor for acquiring digital images;
 a processor; and
 one or more non-transitory processor-readable media having code embedded therein for programming one or more processors to perform an auto-focus method, wherein the method comprises:
 (a) acquiring a digital image including data corresponding to one or more faces or other specific objects of interest, or both (hereinafter an "object" and an "object data") that appears to be out of focus;
 (b) applying one or more focus condition classifier programs to the object data, each of the one or more focus condition classifier programs being tuned to a different non-zero degree of out of focus blur, wherein said out of focus classifier programs each comprises one or more slightly out of focus classifiers or one or more significantly out of focus classifiers;
 (c) identifying the object data as corresponding to said object within the digital image;
 (d) determining an out of focus condition for the object also as a result of the applying of the one or more focus condition classifier programs, wherein said out of focus condition corresponds to a particular degree of out of focus blur at which one of the programs is tuned;
 (e) correcting the out of focus condition of the object based on the determining, to thereby generate a corrected object image appearing to be sharply focused; and
 (f) electronically capturing, combining with another image, storing, transmitting, applying an object recognition program to, editing, or displaying the corrected object image, or combinations thereof.

32. The device of claim 31, wherein the method further comprises applying an object recognition program to the corrected object image.

33. The device of claim 31, wherein the identifying the object data and the determining of the out of focus condition of the object are performed simultaneously.

34. The device of claim 31, wherein the method further comprises applying a set of feature detector programs to reject non-object data from being identified as the object data.

35. The device of claim 31, wherein the method further comprises applying a sharply focused classifier program to the object data.

36. The device of claim 35, wherein the method further comprises determining a focus condition based on acceptance of the object data by one of the classifier programs.

37. The device of claim 36, wherein the digital image is one of multiple images in a series that include said object, and wherein said correcting is applied to a different image in the series than said digital image within which the focus condition is determined.

38. The device of claim 31, wherein the method further comprises applying a sharply focused classifier program to the object data.

39. The device of claim 31, wherein the applying comprises applying at least two full classifier sets after determining that no single focus condition applies and that the object data is not rejected as being a specific object.

40. The device of claim 31, wherein the object comprises a face.

41. A digital image acquisition device, comprising:
 a lens and image sensor for acquiring digital images;
 a processor; and
 one or more non-transitory processor-readable media having code embedded therein for programming one or more processors to perform an object detection method, wherein the method comprises:
 (a) acquiring a digital image;
 (b) extracting a sub-window from said image;
 (c) applying two or more shortened face detection classifier cascades, each trained to be selectively sensitive to a different focus condition of one or more faces or other specific objects of interest, or both (hereinafter "object"), wherein each different focus condition corresponds to a different degree of out of focus blur of the object;

(d) based on the applying, determining a probability that a specific object with a certain focus condition, corresponding to a certain degree of out of focus blur of the object, is present within the sub-window;

(e) based on the determining, applying an extended object detection classifier cascade trained for sensitivity to said certain focus condition, wherein the certain focus condition is determined by applying one or more out of focus classifier cascades which each comprises one or more slightly out of focus classifiers or one or more significantly out of focus classifiers;

(f) providing a final determination that the specific object exists within the image sub-window; and (g) repeating steps (b)-(e) one or more times for one or more further sub-windows from the image or one or more further focus conditions, or both.

42. The device of claim 41, wherein the method further comprises applying a sharply focused classifier cascade.

43. The device of claim 42, wherein the method further comprises determining a focus condition of the specific object within a sub-window based on acceptance by one of the classifier cascades.

44. The device of claim 43, wherein the digital image is one of multiple images in a series that include the specific object, and the method further comprises correcting an out of focus condition of the specific object within a different image in the series than said digital image within which the focus condition is determined.

45. The device of claim 41, wherein the object comprises a face.

* * * * *

UNITED STATES PATENT AND TRADEMARK OFFICE
CERTIFICATE OF CORRECTION

PATENT NO.           : 8,648,959 B2
APPLICATION NO.      : 12/944701
DATED                : February 11, 2014
INVENTOR(S)          : Adrian Capata et al.

Page 1 of 1

It is certified that error appears in the above-identified patent and that said Letters Patent is hereby corrected as shown below:

In the claims:

Claim 11, column 27, line 49  After "the" insert --object--

Claim 26, column 29, line 27  After "the" insert --object--

Signed and Sealed this
Twelfth Day of August, 2014

Michelle K. Lee
*Deputy Director of the United States Patent and Trademark Office*